(12) United States Patent
Wachtler et al.

(10) Patent No.: US 7,127,067 B1
(45) Date of Patent: Oct. 24, 2006

(54) SECURE PATCH SYSTEM

(75) Inventors: Axel Wachtler, Meissen (DE); Ralf Findeisen, Dresden (DE); Frank Schuecke, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 11/219,260

(22) Filed: Sep. 2, 2005

(30) Foreign Application Priority Data

Jun. 30, 2005 (DE) ...................... 10 2005 030 590

(51) Int. Cl.
*H04K 1/00* (2006.01)
*H04L 9/00* (2006.01)

(52) U.S. Cl. ........................ 380/255; 380/281; 380/282

(58) Field of Classification Search ................ 380/255, 380/281, 282
See application file for complete search history.

(56) References Cited

OTHER PUBLICATIONS

Key management for large scale end-to-end encryption; Witzke, E.L.; Pierson, L.G.; Security Technology, 1994. Proceedings. Institute of Electrical and Electronics Engineers 28th Annual 1994 International Carnahan Conference on Oct. 12-14, 1994 pp. 76-79.*

On the security of a digital signature with message recovery using self-certified public key Jianhong Zhang; Hu'an Li; Wireless Communications, Networking and Mobile Computing, 2005. Proceedings. 2005 International Conference on vol. 2, Sep. 23-26, 2005 pp. 1171-1174.*

Digital signatures and public key cryptosystems with multilayer perceptrons Yee, L.P.; De Silva, L.C.; Neural Information Processing, 2002. ICONIP '02. Proceedings of the 9th International Conference on vol. 5, Nov. 18-22, 2002 pp. 2308-2311 vol. 5.*

* cited by examiner

*Primary Examiner*—David Jung
(74) *Attorney, Agent, or Firm*—Meyertons Hood Kivlin Kowert & Goetzel, P.C.; B. Noël Kivlin

(57) ABSTRACT

Patch servers, patch clients and corresponding methods are provided that may increase secret protection and key loss tolerance. A patch server includes a first key generation platform and a second key generation platform different from the first one. A first and second private key group containing a plurality of first or second private keys, respectively, is generated using the first or second key generation platform, respectively. One of the first private keys is selected from the first private key group, and one of the second private keys is selected from the second private key group. A first digital signature is generated based on the patch and the first selected private key. A second digital signature is generated based on the patch and the second selected private key. The patch is transmitted to the patch client together with the first and second digital signatures.

42 Claims, 13 Drawing Sheets

| First public key group | | | | Second public key group | | | | Third public key group | | | |
|---|---|---|---|---|---|---|---|---|---|---|---|
| $PK_{11}$ 300 | $PK_{12}$ 305 | $PK_{13}$ 310 | $PK_{14}$ 315 | $PK_{21}$ 320 | $PK_{22}$ 325 | $PK_{23}$ 330 | $PK_{24}$ 335 | $PK_{31}$ 340 | $PK_{32}$ 345 | $PK_{33}$ 350 | $PK_{34}$ 355 |

| First private key group | | | | Second private key group | | | | Third private key group | | | |
|---|---|---|---|---|---|---|---|---|---|---|---|
| $SK_{11}$ 200 | $SK_{12}$ 205 | $SK_{13}$ 210 | $SK_{14}$ 215 | $SK_{21}$ 220 | $SK_{22}$ 225 | $SK_{23}$ 230 | $SK_{24}$ 235 | $SK_{31}$ 240 | $SK_{32}$ 245 | $SK_{33}$ 250 | $SK_{34}$ 255 |

260 — 270 — 280

SECURE PATCH SYSTEM

BACKGROUND OF THE INVENTION

1. Field of the Invention

The present invention generally relates to software updates and in particular to the secure distribution of software updates in a distributed system.

2. Description of the Related Art

Many computer media or communication systems suffer from security holes that may allow unauthorized data access or the dissemination of worms. Thereby, considerable damage can be caused. Usually, such security holes are closed by means of security related software updates, also referred to as patches. In distributed systems, patches may be generated by a patch server and then distributed to a number of patch clients, for example, mobile units of a communications system or consumer devices having embedded processors.

However, patches loaded from an insecure system still need to be protected against malicious modification. Otherwise, a virus or worm could still cause effective attacks. For example, a denial of service (DoS) attack could be carried out against a GSM (Global System for Mobile Communications) net whereby only one infected active device per radio cell suffices to block the whole system.

In prior art systems, the public key cryptography (PKC), also referred to as asymmetric cryptography, is often used to protect package distribution by avoiding sending secret keys over insecure networks. The basic idea is that there are two keys: a public key (PK) which is applicable for encryption only and publicly known and a private key, also referred to as secret key (SK), that must be known to decrypt messages. The security relies on the difficulty in deriving the private key from the public key and the difficulty in deciphering an encrypted message without knowing the private key.

A special application of PKC is the digital signature. Here, a cryptographic hash sum over some document is computed and then this hash sum is encrypted with the creator's private key to create the digital signature. The signature is attached in some form to the document. Anybody who knows the creator's public key can compute the hash sum of the document, decrypt the attached signature with the public key and compare the result with the hashed document. Alternatively, the digital signature may be generated by decrypting the hash sum with the creator's private key. For verification, the receiver of the document may again calculate the hash sum, encrypt it with the public key and compare the result with the provided signature.

A correct digital signature proves that its creator knew the private key (authenticity) and that the document was not modified since the signature creation (integrity) neither by adding, deleting or modifying contents, nor by reordering parts of it. The latter is provided by the properties of the employed cryptographic hash functions, for example, MD5 (Message Digest Algorithm 5), SHA-1 (Secure Hash Algorithm 1) or RIPEMD-160 (Race Integrity Primitives Evaluation Message Digest 160). However, it cannot be seen, e.g., whether the private key was stolen during signature creation.

Asymmetric cryptography is often used for digital signatures, since also non-trusted parties, i.e., without knowledge of secrets are able to check the digital signature. However, PKC suffers from the disadvantage of being sensible and slow. In addition, security holes in PKC systems are due to possible man-in-the-middle attacks. This can be prevented if the authenticity of the public keys can be proven in some way. In some scenarios, it suffices to compute a cryptographic checksum over the public key, the so-called fingerprint, and to tell it to the receiver directly, e.g., via telephone. In complex and dynamically changing environments however, this is not possible. Therefore public key infrastructures (PKI) are used for this purpose where public keys are digitally signed by a hierarchy of trustworthy parties. Implementation and maintenance of a PKI infrastructure, however, is expensive.

In addition, there are a number of further risks and problems arising with PKC, for instance when RSA (Rivest-Shamir-Adleman) encryption is used. Beyond the slowness of PKC, plaintext portions are padded with random bits since otherwise, several attacks are possible. Therefore, plaintexts are usually not directly encrypted with public keys. Instead, a random session key is generated and used for traditional symmetric encryption, for example, using algorithms like AES (Advanced Encryption Standard) or Two-fish. In these protocols, referred to as hybrid protocols, only the session key is encrypted with the public key and added to the ciphertext.

However, even when using a hybrid protocol, the session key still has to be padded randomly to, e.g., 512 or 1024 bit lengths. Insufficient padding leads to reduced security.

Moreover, if a bit in a private RSA key is flipped by hardware or by an attacker and then this private key is used for defining a message, the public key can be factorized and thus the security is broken completely. This leads to considerable risks in PKC systems.

Furthermore, trapdoors can be implemented into the generation of public keys. An attacker knowing about the modifications of the creation algorithm will be able to deduce the private key easily from the public key, so that again the security is fully broken.

Therefore, many prior art patch systems try to avoid PKC. In systems where there is a dialog between trusted servers and clients like embedded processors (for example in GSM telephones), a serialized key (possibly in a smart card) and a challenge response protocol would provide a simple and robust solution. However, for many systems this is not applicable. For instance, when the receiver is fixed and passive during boot time, no serialization is possible.

Alternatively, prior art systems in which parties share common secrets use cryptographic checksums like HMAC (Keyed-Haching for Message Authentication). One example therefor is the authentication and key handling in GSM/UMTS (Global System for Mobile Communications/Universal Mobile Telecommunications System) mobile phones, where keys are distributed by SIM (Subscriber Identification Module) cards. This solution is simpler, faster and more robust than PKC. However, though an HMAC cryptographic checksum could prove integrity, the corresponding secret key would be fixed in the firmware of the EP (Embedded Processor) receiver. Thus, leaking this secret HMAC key would make all checksums valueless.

Therefore, many prior art patch systems use digital signatures. However, often assuring integrity is not enough. If patches are reverse engineered, security holes can be found nevertheless. A signed patch proves only its trueness, not its security. Security is provided only by trust in the author. Further, signing patches using the same public key for all patch clients suffers from the disadvantage of being considerably insecure. If the private key is leaked all security is lost. An even more probable scenario is one where the private key is lost. In this case, no more patches could be released and all patch clients would become more and more insecure.

SUMMARY OF THE INVENTION

Therefore, improved patch servers, patch clients and corresponding methods are provided that may overcome the disadvantages of the prior art. Embodiments may increase secret protection and key loss tolerance. This may in turn increase investment protection. Further, protection against key revealing may be improved. Other embodiments may decrease the risk of weak keys in cases where the key generation still has security holes.

According to an embodiment, a patch server is connected to a patch client for providing a patch to the patch client. The patch server includes a first key generation platform, a second key generation platform different from the first key generation platform, a first key selector, a second key selector, a first signature generator, a second signature generator, and a transmitter. The first key generation platform is arranged to generate a first private key group including a plurality of first private keys. The second key generation platform is arranged to generate a second private key group including a plurality of second private keys. The first and second key selectors are arranged to select one of the first and second private keys from the first and second private key group, respectively. The first signature generator is arranged to generate a first digital signature based on the patch and the first selected private key. The second signature generator is arranged to generate a second digital signature based on the patch and the second selected private key. The transmitter is arranged to transmit the patch together with the first and second digital signatures to the patch client.

According to another embodiment, a method of providing a patch to a patch client is provided. A first private key group containing a plurality of first private keys is generated using a first key generation platform. A second private key group containing a plurality of second private keys is generated using a second key generation platform different from the first key generation platform. One of the first private keys is selected from the first private key group, and one of the second private keys is selected from the second private key group. A first digital signature is generated based on the patch and the first selected private key. A second digital signature is generated based on the patch and the second selected private key. The patch is transmitted to the patch client together with the first and second digital signatures.

A further embodiment relates to a patch client connected to a patch server for receiving a patch from the patch server. The patch client includes first and second storage means, first and second key selectors, and first and second signature verification components. The first storage means stores a first public key group containing a plurality of first public keys which have been generated by a first key generation platform. The second storage means stores a second public key group containing a plurality of second public keys which have been generated by a second key generation platform different from the first key generation platform. The first and second key selectors are arranged to select one of the first and second public keys from the first and second public key group, respectively. The first signature verification component is arranged to verify a first digital signature received from the patch server together with the patch using the first selected public key. The second signature verification component is arranged to verify a second digital signature received from the patch server together with the patch using the second selected public key. The patch client is arranged to install the patch only if the results of verifying the first and second digital signatures indicate authenticity and integrity of the first and second digital signatures, respectively.

According to still another embodiment, a method of installing a patch in a patch client is provided. The patch is received together with a first and a second digital signature from a patch server connected to the patch client. A first public key group including a plurality of first public keys is stored in the patch client, the first public keys having been generated by a first key generation platform. Further, a second public key group including a plurality of second public keys is stored in the patch client, the second public keys having been generated by a second key generation platform different from the first key generation platform. One of the first public keys and one of the second public keys is selected from the first and second public key group, respectively. The first digital signature is verified using the first selected public key, and the second digital signature is verified using the second selected public key. The patch is installed in the patch client only if the results of verifying the first and second digital signatures indicate authenticity and integrity of the first and second digital signatures, respectively.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 2 is a block diagram illustrating secret key management according to an embodiment;

FIG. 3 is a block diagram illustrating public key management according to an embodiment;

DETAILED DESCRIPTION OF THE INVENTION

The illustrative embodiments of the present invention will now be described with reference to the figure drawings. The software of a patch client, e.g., an embedded processor of some device may get patches from an insecure system. The embodiments may guarantee that these patches are unmodified when applied. For instance, malicious patches could be done by some virus or worm. It may also be possible that undiscovered security holes in the software or in the patches themselves have the same effect. The embodiments may protect the patch client against the negative effects of such scenarios.

Figure 1:
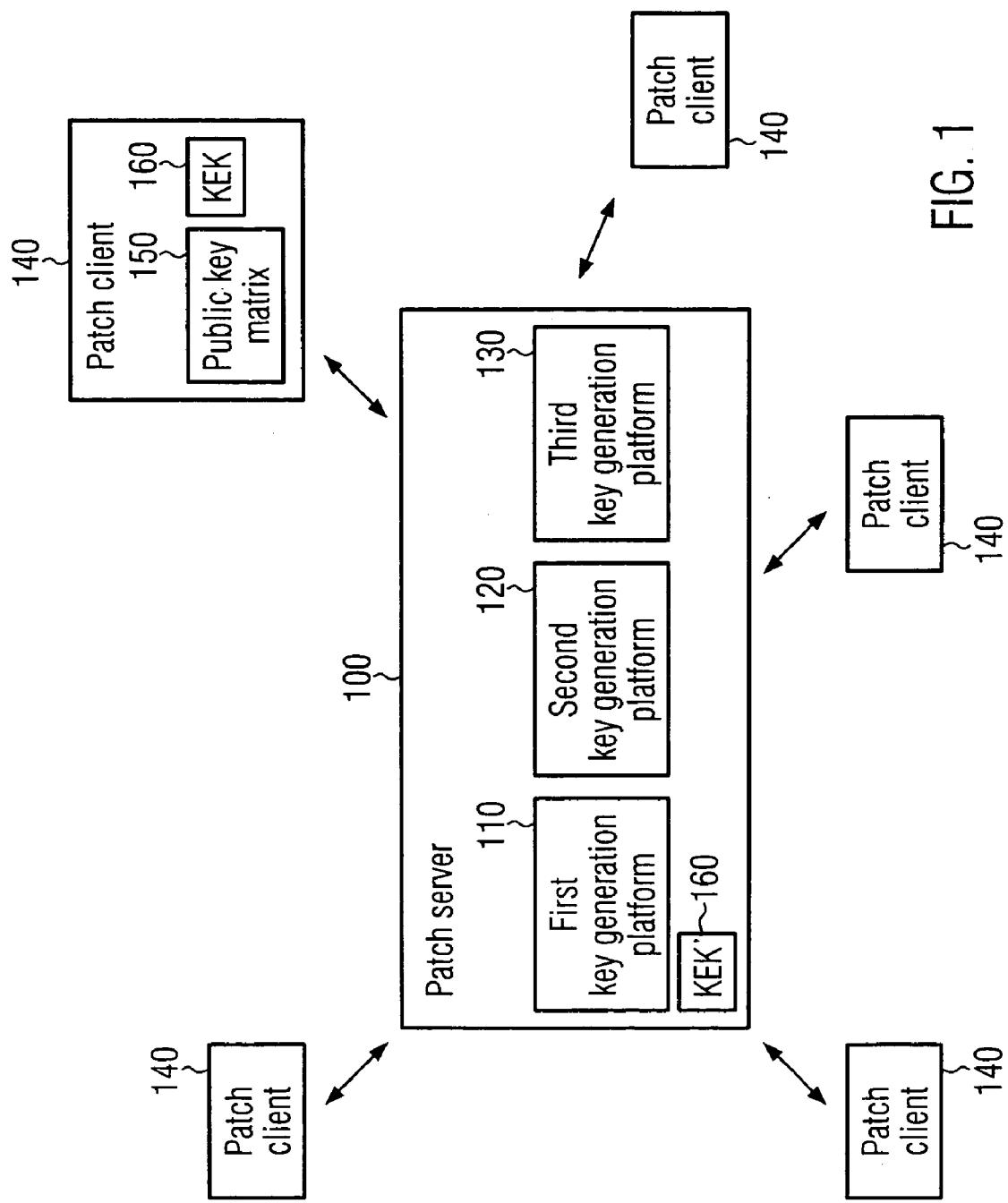
FIG. 1 is a block diagram depicting the components of a patch system according to an embodiment.

In FIG. 1, components of a patch system according to an embodiment are shown. A patch server 100 is connected to a plurality of patch clients 140 to provide the patch clients with security related software updates, i.e., patches. The patch clients may be for instance embedded systems, personal computers or media/communication devices. They may be connected to the patch server 100 through any kind of suitable connection, for instance wireless or wired connections. The patch server 100 may be a computer or distributed computer system.

According to the depicted embodiment, the patch server 100 includes three key generation platforms 110, 120, 130. The platforms 110, 120, 130 may be separate from each other and may serve for both key generation and handling. Generally, a platform describes some sort of framework, either in hardware or software or both, which allows software to run. The key generation platforms 110, 120, 130 of the present embodiment are based on different applications and hardware and may be used in parallel. This may improve security with respect to trapdoors implemented into key generating devices. In embodiments where HSMs (Hardware Secutiy Modules) are acceptable as the only base, the use of different software and hardware for the key generation may, however, be dispensable.

According to the embodiment, the first key generation platform 110 generates and stores keys with the help of some nShield HSM of nCipher. The second key generation platform 120 may generate and use keys under Knoppix Linux. Working in RAM (Random Access Memory) only, Knoppix Linux leaves no traces on a hard disk. The generated keys may be stored externally in encrypted form. Key handling in the second key generation platform 120 may be achieved by OpenSSL. In addition, a long pass phrase may be split so that it must be typed by two different persons, one after the other, to unlock private keys for use. The third key generation platform 130 may handle keys by OpenSSL traditionally but under a SELinux (Security Enhanced Linux) system or some equivalent high security operating system. Alternatively, cryptocards could be used by the third key generation platform 130.

To increase the reliability of preventing the leaking of private keys, secret sharing ("k of n operator cards") may be used in nShield. Independent parties may be included in the signing process and keys may be split among two administrators or groups of administrators of the first key generation platform 110.

The patch system of the present embodiment signs patches with multiple signatures using varying subsets of secret keys generated and managed by the key generation platforms 110, 120, 130. The corresponding public keys may also be generated by the key generation platforms 110, 120, 130, respectively and input into the patch clients 140 during their production. The public keys may then be stored in the patch clients 140 in a public key matrix 150.

Before being transmitted to the patch clients 140, patches may be encrypted symmetrically using a random session key. The random session key in turn may be encrypted using a secret master key which may be commonly used for all patch clients 140, also referred to as the key encryption key (KEK) 160. This may provide increased speed and simplicity with respect to prior art PKC systems. In addition, protection against unknown weaknesses of the encryption algorithm may be increased. These weaknesses may be harder to exploit by an attacker since smaller portions of the plaintext are encrypted with the same key. The KEK key 160 may be stored securely by the patch server 100.

In the patch client 140, the KEK key 160 may be stored in hidden form for increased security. To this end, hardware and software measures may be combined. For example, a 128-bit key may be built via XOR (Exclusive OR) gating from several 128-bit portions (secret splitting). The data may be scattered over the program and hard to find. Further, the use of function pointers that are dynamically assigned via crazy computation done, e.g., by macros at several very different places in the program may provide a countermeasure against reverse engineering, as well as disabling usage of debuggers. Such secret splitting may be used during encryption in a way that practically nobody knows the key, only a program during runtime can build it temporarily.

Both the public key matrix 150 and the key encryption key 160 may be plugged into the patch client 140 by the vendor before the respective patch client 140 is sold to a user. The corresponding secret keys may remain at the vendor in secure places. As in the present embodiment, the public keys are fixed, a change of the private keys is not possible—only a revocation. Thus, the private keys may be hidden in the patch server 100.

Each patch client 140 may include a non-resettable counter that stores a sequence number of the last received patch to avoid replay attacks. This may allow for preventing older patches having known security holes being applied. To this end, the patch clients 140 may for instance check a time stamp received together with a patch against a radio-received time.

Each patch may include a number of patch records. To prevent attacks using overflows, the number and size of patch records may be limited by software. The patch records may not be activated as long as the patching is done. Therefore, it may not be necessary to compute checksums of single patch records.

According to the present embodiment, twelve key pairs are used for signing the patches. Each patch may contain three signatures, each signature being based on one key out of a group of four, as will be described in more detail below. The underlying principle is illustrated in FIGS. 2 and 3.

FIG. 2 shows a set of private keys 200–255 generated and managed by the patch server 100. A first private key group 260 may include four private keys 200–215. Similarly, a second private key group 270 may include four other private keys 220–235, and a third private key group 280 may contain four further private keys 240–255. The first, second and third private key groups 260, 270, 280 may be generated and handled by the first, second and third key generation platforms 110, 120, 130, respectively. According to an embodiment, the three private key groups 260, 270, 280 may have different trust levels.

In the key generation platforms 110, 120, 130, HSMs may be used to prevent illegal extraction of private keys 200–255. Alternatively, "mixed keys", e.g., based on HSM and Knoppix/OpenSSL may be used which may provide the advantage of secure storage as well as full trust. In addition, this may allow for controlling the key generation and recovering keys without requiring another HSM device. The access rights to the secret keys 200–255 may be splitted among non-cooperating groups. Further, the principle of secret sharing ("3 of 5 operator cards" in the case of HSMs) may be used.

The corresponding public keys may be stored in the patch client 140, in the matrix 150 shown in more detail in FIG. 3.

A first public key group 360 may contain four public keys 300–315 corresponding to the private keys 200–215 of the first private key group 260, respectively. The first public key group 360 may have been generated by the first key generation platform 110 and input into the patch client 140 during production. A second public key group 370, which may have been generated by the second key generation platform 120 and input into the patch client 140 by the vendor, may include four public keys 320–335, corresponding to the private keys of the second private key group 270. Finally, a third public key group 380 may consist of four public keys 340–355 corresponding to the four private keys 240–255 of the third private key group 280. The third public key group 380 may have been generated by the third key generation platform 380 and stored into the patch client 140 before selling it.

The private keys 200–255 may be generated in a standardized format. This may provide for key backup and disaster recovery. Further, the key generation may not be dependent on any security provider. In embodiments applying RSA encryption, the public keys 300–355 may be handled directly as C headers via modulus (i.e., the product p*q of secret primes) and public exponent. The signatures may be generated in PKCS#1 (Public Key Cryptography Standard #1) format, supported by RSA's CryptoCME and BSAFE libraries as well as by OpenSSL which cooperates with HSM devices.

In an embodiment, the public keys 300–355 may be 1024 bits long. However, in other embodiments, other key lengths may be used. For example, 512-bit RSA or DSA (Digital Signature Algorithm) keys may be used to save storage and computing time of signature checking. In contrast to the KEK key 160, the public keys 300–355 may not be hidden within the patch clients 140. According to the present embodiment, the KEK key 160 is a master key for all patch clients 140 and has a bit length of 128 bits. For example, the KEK key 160 may be a 128-bit AES key. Alternatively, a 128-bit Twofish key or 256-bit AES key or any other suitable key may be used for the KEK key 160.

It is to be noted that the use of twelve key pairs for signing the patches is only a specific example. Alternatively, less or more key groups could be employed (the patch server 100 then including less or more key generation platforms, respectively) and each public/private key group could contain less or more public/private keys than four. Further, the arrangement of keys in a matrix has been chosen for illustration purposes only. Various other forms could be used for storing the public and private keys. Specifically, the three private key groups 260, 270, 280 may be stored and handled separately using the three key generation platforms 110, 120, 130. For security reasons, even the individual private keys 200–255 of each private key group 260, 270, 280 may be stored separately.

Referring now to FIGS. 4 to 8, 11, 12, and 14, the operation of the patch server 100 according to a first embodiment will be described. In this embodiment, the patch clients 140 will be able to verify the signatures provided from the patch server 100 together with the patch after reading the entire patch.

Figure 4:
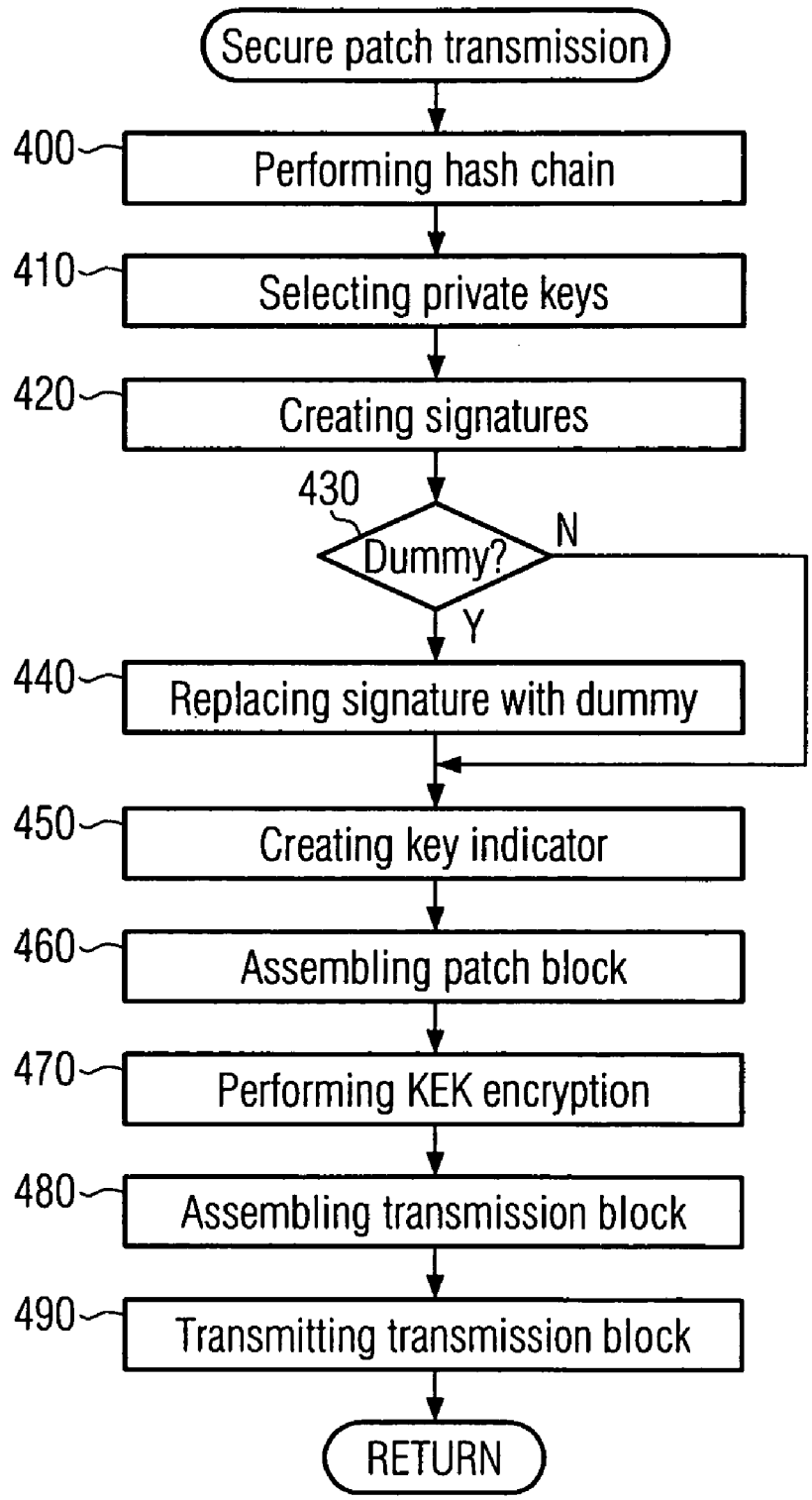
FIG. 4 is a flow diagram illustrating patch transmission according to an embodiment.
Figure 5:
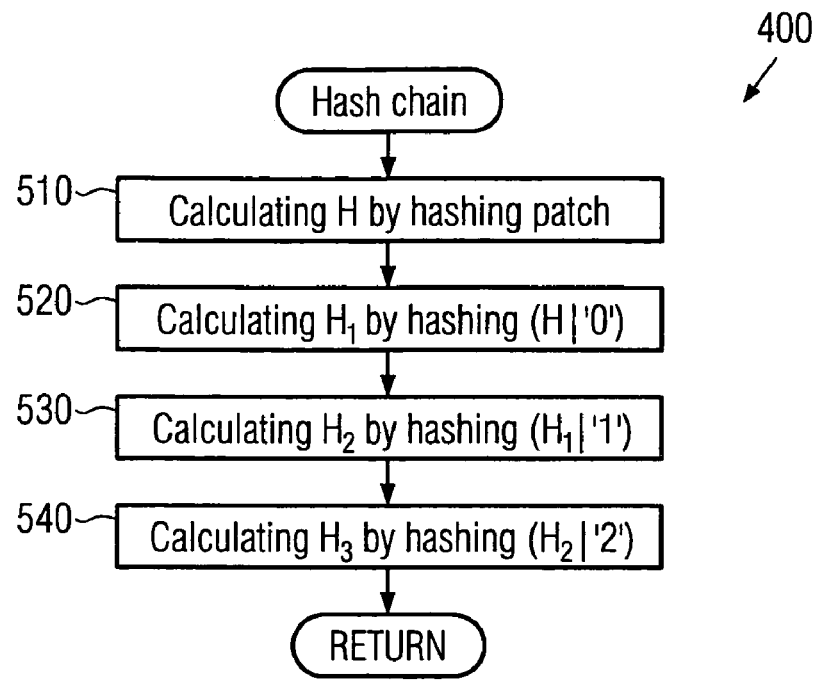
FIG. 5 illustrates the steps of a hash chain according to an embodiment.

FIG. 4 shows the overall operation of the patch server 100 according to the embodiment. In step 400, a hash chain may be performed. The hash chain 400 may include four steps, as shown in FIG. 5.

First, a basic hash sum H may be calculated by hashing the patch in step 510. Subsequently, a first hash sum $H_1$ may be calculated by hashing a concatenation (H|'0') of the basic hash sum H with a byte having the value 0 in step 520 (thereby, "|" means concatenation and '0' is the byte with value 0). Then in step 530, a second hash sum $H_2$ may be calculated by hashing a concatenation ($H_1$|'1') of the first hash sum $H_1$ calculated in step 520 with a byte '1' having the value 1. Finally, a third hash sum $H_3$ may be calculated by hashing a concatenation ($H_2$|'2') of the second hash sum $H_2$ resulting from step 530 with a byte '2' having the value 2 (step 540).

It is to be noted that according to the present embodiment, each patch includes three signatures which will be calculated in step 420 (see below), based on the three hash sums $H_1$, $H_2$ and $H_3$. In other embodiments, the patches may include less or more signatures. In these embodiments, the hash chain 400 may accordingly be shorter or longer.

Figure 6:
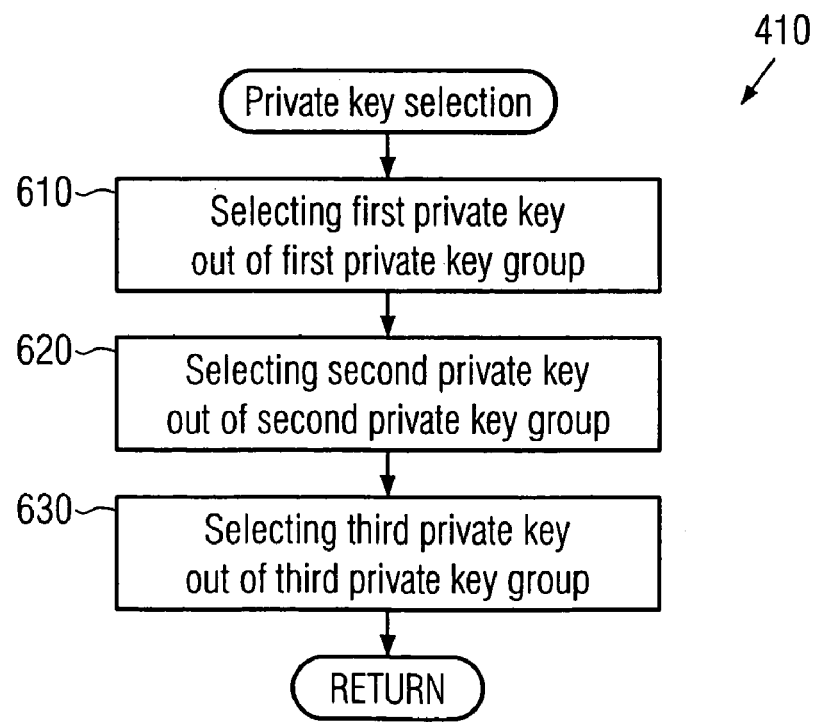
FIG. 6 is a flow diagram showing private key selection according to an embodiment.

Returning to FIG. 4, private keys may now be selected in step 410 for creating the signatures in step 420. The individual steps of the private key selection 410 according to the embodiment are illustrated in FIG. 6.

A first private key may be selected from the first private key group 260 in step 610. Then, a second private key may be selected out of the second private key group 270 in step 620. Similarly, a third private key may be chosen out of the third private key group 280 in step 630.

It is to be understood that the shown sequence of steps has been chosen for illustration purposes only. Of course, the private keys could be selected in any other order. Alternatively, some or all of the private keys could be selected before performing the hash chain in step 400. Further, in embodiments where a different number of private key groups 260–280 are used, the private key selection 410 may accordingly include less or more selecting steps than the three steps 600–630 shown in FIG. 6.

Following the private key selection 410, three digital signatures $D_1$ to $D_3$ may be generated in step 420, which may later be added to a patch to be sent to a patch client 140 for allowing authenticity and integrity checking. The private key selection 410 is shown in more detail in FIG. 7.

In step 710, a first digital signature $D_1$ may be calculated by signing the first hash sum $H_1$ calculated in step 520 using the first private key selected in step 610. Then in step 720, a second digital signature $D_2$ may be calculated by signing the second hash sum $H_2$ resulting from step 530 using the second private key selected from the second private key group 270 in step 620. Finally, in step 730 a third digital signature $D_3$ may be calculated by signing the third hash sum $H_3$ calculated in step 540 using the third private key selection in step 630. Thus, the present embodiment employs signature triples based on one key of each kind.

Thereby, signing the hash sums $H_1$ to $H_3$, respectively, may include another hash operation followed by an encryption (or decryption, depending on the employed signing algorithm) using the respective selected private key. Alternatively, the digital signatures $D_1$ to $D_3$ may be calculated by simply encrypting or decrypting the respective hash sum $H_1$ to $H_3$ with the corresponding selected private key. Depending on which implementation is used for the key generation platforms 110 to 130, other algorithms may be used for creating the digital signatures $D_1$ to $D_3$.

Figure 7:
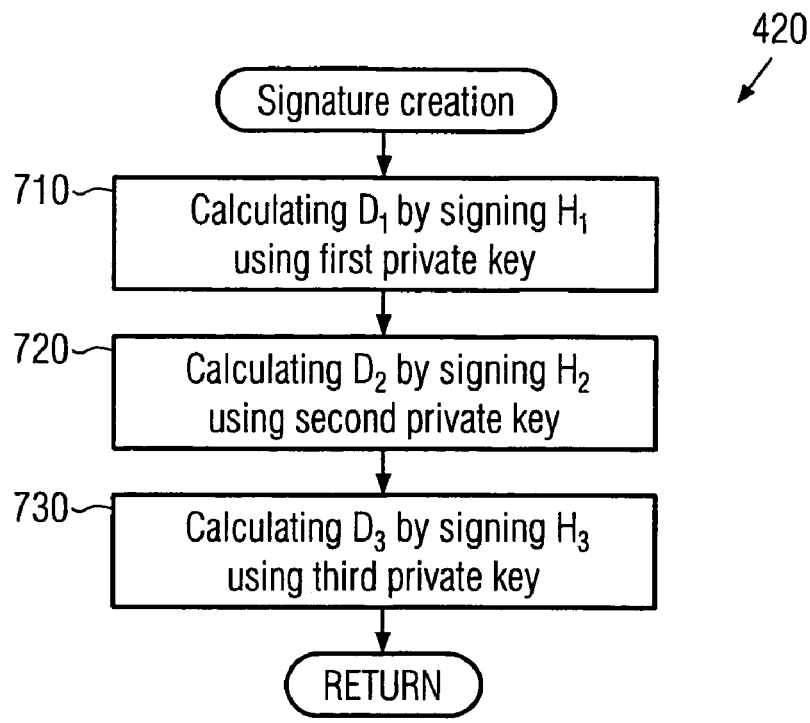
FIG. 7 is a flow diagram illustrating signature creation according to an embodiment.
Figure 8:
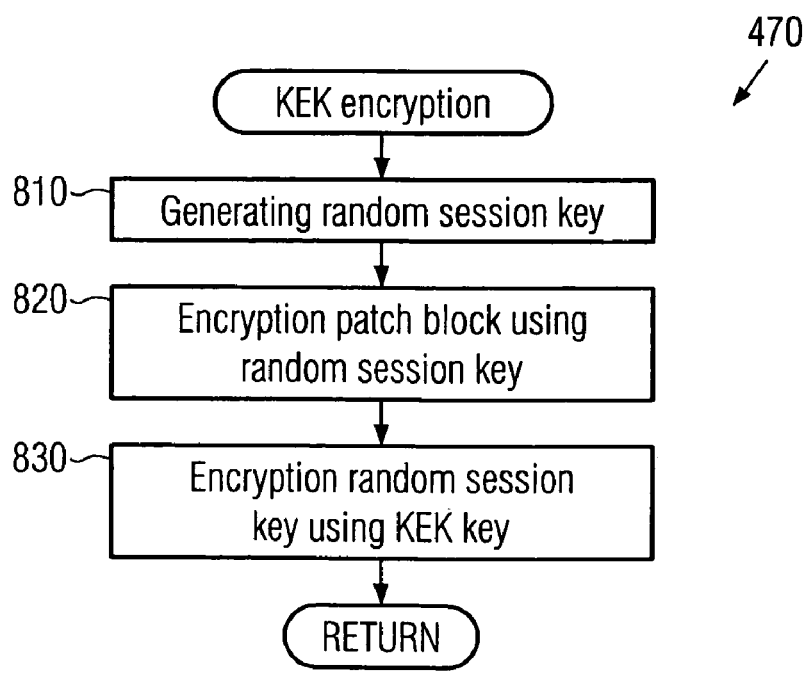
FIG. 8 demonstrates the steps of KEK encryption according to an embodiment.

Again, the particular sequence of steps shown in FIG. 7 has only illustrative character. In other embodiments, the digital signatures $D_1$ to $D_3$ may be created in any other order or the steps of the signature creation 420 may be interleaved with steps of the hash chain 400 and/or the private key selection 410. For example, step 710 of calculating the first digital signature $D_1$ may be performed a soon as the first hash sum $H_1$ has been calculated (step 520) and the first private key has been selected (step 610). The calculation 720 of the second digital signature $D_2$ may be brought forward in a similar way. Further, the embodiments where more or less digital signatures are added to the patch, the signature creation 420 may accordingly include more or less calculation steps.

After the signatures have been created in step 420, it may be determined in step 430 whether one of the signatures is to be a dummy signature. Using dummy signatures may allow for safely skipping compromised or lost keys. For instance, if in one of steps 610 to 630 a private key has been selected that is known to be compromised, it may be determined in step 430 that the corresponding digital signature is to be a dummy signature. For this purpose, the patch server 100 may store in some appropriate form which of the private keys 200–255 have been stolen or lost, i.e., are not to be used any more. This could be done, for instance, by maintaining a corresponding look up table. Thus, according to the present embodiment, lost or stolen keys can be safely skipped. It may not be necessary to revoke and replace them.

If a dummy signature is to be used, the respective digital signature created in 420 may be replaced with a dummy in step 440. Alternatively, the determination 430 whether a signature is to be a dummy signature may be brought forward before the signature creation, and in case a signature is to be a dummy signature, the corresponding signature creation step 710, 720, 730 may be skipped, directly using a dummy for the respective signature.

Figure 12:
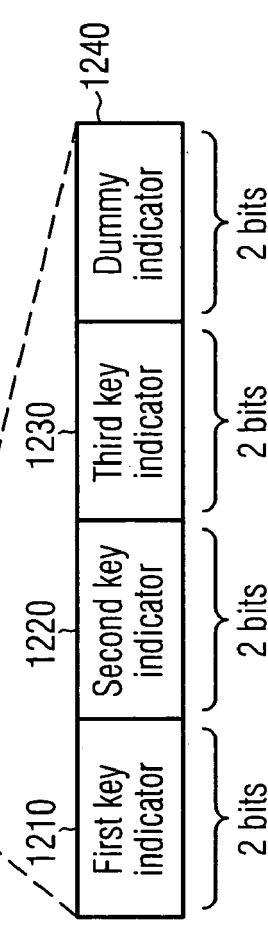
FIG. 12 is a block diagram illustrating the configuration of a key indicator according to the embodiment.

In step 450, a key indicator may be created. The key indicator may specify which keys were selected in step 410 from the three private key groups 260, 270, 280. An exemplary composition of the key indicator is shown in FIG. 12.

According to the present embodiment, the key indicator is an 8 bit integer value. The first two bits may represent a first key indicator 1210 specifying which one of the four private keys 200–215 of the first private key group 260 has been selected to create the first digital signature $D_1$. For example, if the value of the these first two bits is 3, this may indicate that the third private key 210 has been selected in step 610 and applied in step 710. The next two bits may build a second key indicator 1220 indicating which one of the four private keys 220–235 of the second private key group 270 has been selected (step 620) to create the second digital signature (step 720). Similarly, the fifth and sixth bits may be used for a third key indicator 1230 to specify which one of the four private keys 240–255 has been selected in step 630 for generating the third digital signature in step 730.

In embodiments where more or less private key groups are used, the key indicator may accordingly include more or less individual key indicators 1210–1230. Further, there may be embodiments in which each of the private key groups 260, 270, 280 includes more or less than four private keys. Accordingly, the first to third key indicators 1210–1230 may then be longer or shorter, respectively. In addition, the individual key indicators 1210–1230 may be ordered differently.

The key indicator may further specify whether a dummy signature has been used and if so, which one of the signatures is the dummy signature. To this end, the last two bits of the key indicator shown in FIG. 12 represent a dummy indicator 1240. According to the present embodiment, the dummy indicator 1240 specifies that all three signatures $D_1$ to $D_3$ are valid signatures if the value of its two bits is 0. A value of 1, 2 or 3 may indicate that the first, second or third signature, respectively, is a dummy signature. Alternatively, the values of the dummy indicator could of course be assigned differently.

In other embodiments, more or less than three signatures may be used to sign the patch. The dummy indicator 1240 may then accordingly be longer or shorter than two bits. Further, more than one signature may be a dummy signature. In such embodiments, the dummy indicator 1240 may also be longer than two bits.

Once the key indicator has been created, a patch block may be assembled in step 460. According to the present embodiment, the patch block has the format shown in FIG. 11.

Figure 11:
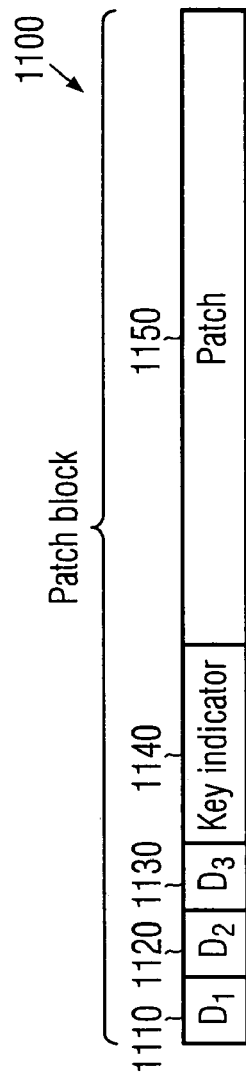
FIG. 11 illustrates the composition of a patch block according to an embodiment.

As illustrated in FIG. 11, the patch block 1100 may start with the first digital signature 1110 created in step 710, followed by the second digital signature 1120 and the third digital signature 1130 generated in steps 720 and 730, respectively. Following the signatures 1110 to 1130, the patch block 1100 may include the key indicator 1140 resulting from step 450. Finally, the patch 1150 itself may be contained in the patch block 1140. The particular composition of the patch block 1100 shown in FIG. 11 is not to be construed as limiting the invention. In other embodiments, the patch block 1100 may be arranged in a different way.

Following the patch block assembly 460, KEK encryption may be performed in step 470. The KEK encryption 470 according to the present embodiment is shown in more detail in FIG. 8.

In step 810, a random session key, also referred to in the following as the symmetric key, may be generated. The session key generation may be secured by splitted parts of pass phrases, as for instance by shared secrets on operator cards of nCipher HSM devices. In other embodiments, the symmetric key may not be generated during the patch transmission processing but instead be generated previously and stored in the patch server 100. In such embodiments, the symmetric key may be hidden in the hardware. This may be accomplished in various ways. For instance, as the code will usually be reviewed by many people, a key generation from distributed sources may serve this purpose, such that nobody knows all the details how the key is created, but all information can be reconstructed if necessary. Alternatively, the symmetric key may be hidden inside some HSM. In addition, patch servers 100 of such embodiments may include some hard method to reconstruct the symmetric key in case it is lost.

The random session key may be used in step 820 to encrypt the patch block 1100 assembled in step 460. This may be accomplished using AES encryption. Finally, the random session key may be encrypted in step 830 using the KEK key 160. In other embodiments, steps 820 and 830 may be performed in the inverse order.

During KEK encryption 470, all information (excluding header parts which may need to be plaintext for some reasons) may be encrypted in the output feedback mode (OFB). This may allow the patch to be decrypted later at the patch client 140 as a stream. Padding may not be necessary and recordwise decryption may be possible without any problems. In alternative embodiments, the cipher feedback mode (CFB) may be used for stream encryption instead. The CFB mode is plaintext dependent and errors are spread over at least one block. However, when using the OFB mode, even one bit flipped or added by some attacker has the same fatal effect as a destroyed block, and digital signature verification at the patch client 140 will fail in both cases. So, when using the OFB mode, security is enhanced.

As the digital signatures $D_1$ to $D_3$ have been included into the patch block 1100 (step 460) before performing the KEK encryption step 470, the digital signatures are also protected by encryption according to the present embodiment. This may reduce the risk of an attacker finding security holes.

In order to render the symmetric KEK encryption 470 even more secure, the initialization vector used in the OFB mode may be chosen unique, i.e., such that it can never repeat among all patches. This may for example be achieved by including a sequence number in a fixed part of the initialization vector. Alternatively, a time stamp may be used for this purpose.

Figure 14:
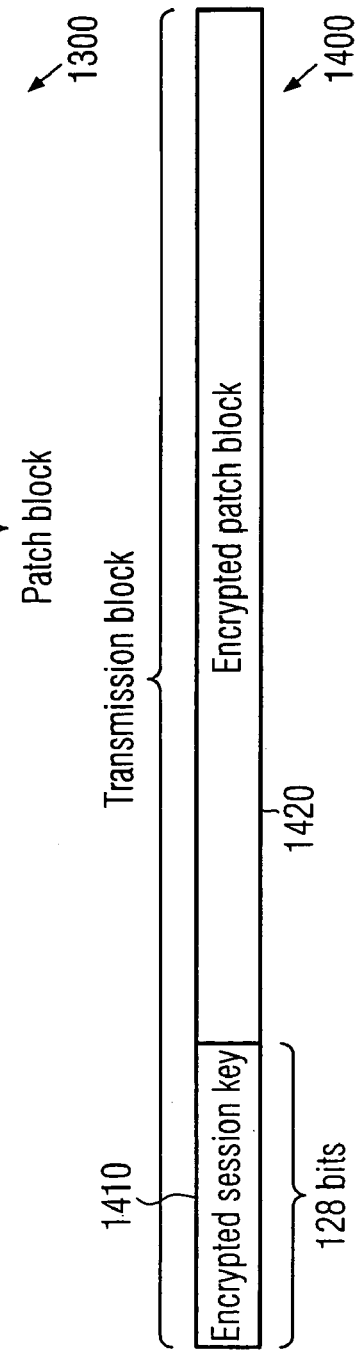
FIG. 14 is a block diagram depicting a transmission block according to an embodiment.

Returning now to FIG. 4, a transmission block may be assembled in step 480. The composition of the transmission block of the present embodiment is shown in FIG. 14.

Specifically, the transmission block 1400 may consist of the encrypted session key 1410 followed by the encrypted patch 1420 resulting from steps 830 and 820, respectively. According to the present embodiment, the encrypted session key is 128 bits long. Other session key lengths may alternatively be used in other embodiments.

Finally, in step 490, the transmission block may be transmitted to the patch client 140.

As already mentioned, a hardware failure during signing might reveal the private key. To avoid this risk, the signatures created in step 420 may be checked before being sent to the patch client 140 (in step 490). Thereby, each signature $D_1$ to $D_3$ may be checked by a different program. For instance, it may be verified by the vendor whether a (not yet sold) patch client 140 boots with the actual patch containing the signature to be checked.

According to the above-described embodiment, verification of the digital signatures $D_1$ to $D_3$ in the patch clients 140 may be possible after reading the entire patch 1150 only. However, in other embodiments it may be desirable to check authenticity and integrity for every record of the patch immediately after decrypting it. This may be allowed in a second embodiment which will now be described with reference to FIGS. 9, 10 and 13.

In this embodiment, the overall operation of the patch server 100 may correspond to the one shown in FIG. 4, and the private key selection 410, dummy handling 430, 440, key indicator creation 450, KEK encryption 470 and transmission block assembly and transmission 480, 490 may be the same as described above. However, a modified hash chain 400 and signature creation 420 may be employed. Further, the patch block assembly 460 may result in a patch block having a different composition than the one described above.

Figure 13:
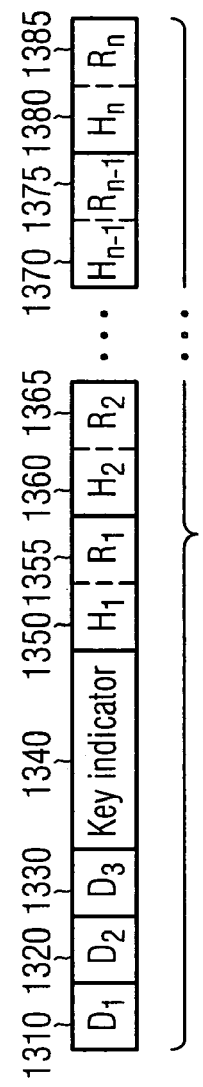
FIG. 13 is a block diagram illustrating the arrangement of a patch block according to another embodiment.

Dealing first with the patch block, its composition according to the present embodiment is shown in FIG. 13.

Similarly to the patch block 1100 of the first embodiment, the patch block 1300 may start with three digital signatures ($D_1$ to $D_3$), 1310, 1320, 1330 followed by a key indicator 1340. The key indicator 1340 may correspond to the key indicator 1140 described above with reference to FIGS. 11 and 12. The digital signatures 1310, 1320, 1330, however, may be calculated in a different way than the digital signatures of the first embodiment, as will be explained below with reference to FIG. 10. Further, each record ($R_1$ to $R_n$) 1355, 1365, 1375, 1385 of the patch may be preceded by a cryptographic hash sum ($H_1$ to $H_n$) 1350, 1360, 1370, 1380.

Figure 9:
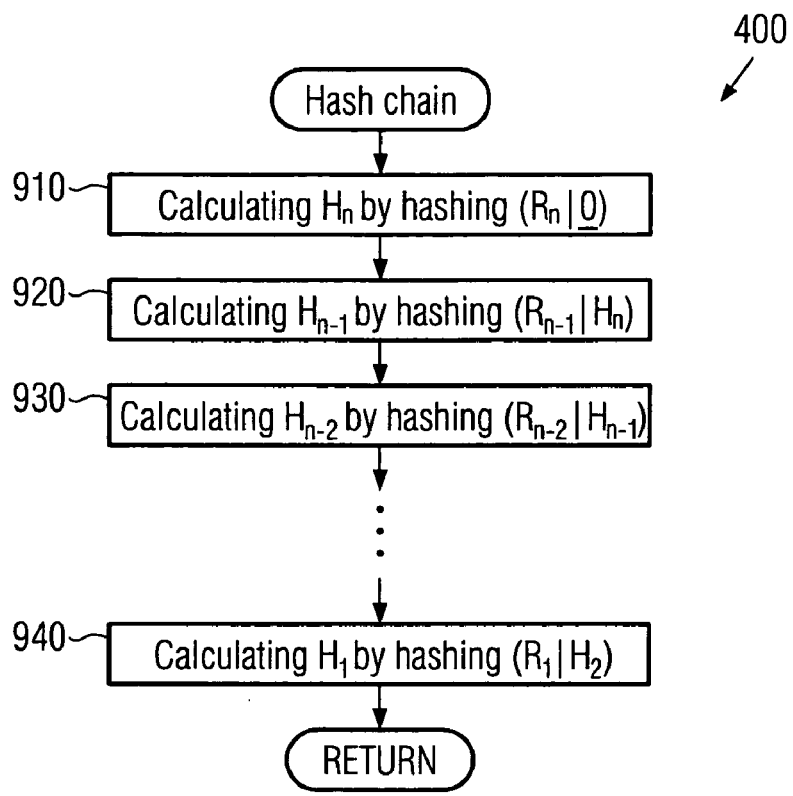
FIG. 9 is a flow diagram illustrating the steps of a hash chain according to another embodiment.

The calculation of the hash sums 1350, 1360, 1370, 1380 according to the present embodiment is carried out in step 400 of FIG. 4 and is shown in more detail in FIG. 9.

First, a hash sum $H_n$ 1380 may be calculated in step 910 by hashing a concatenation ($R_n|0$) of the $n^{th}$ record $R_n$ 1385 of the patch to be transmitted with a hash sum value "0" consisting of 0 bits. In alternative embodiments, only the record $R_n$ may be hashed in step 910. Then, a hash sum $H_{n-1}$ 1370 may be calculated in step 920 by hashing the concatenation ($R_{n-1}|H_n$) of the $(n-1)^{th}$ record $R_{n-1}$ 1375 with the previously calculated hash sum $H_n$ 1380. In the following, hash sums $H_{n-2}$ to $H_1$ may be calculated in an analogous way in steps 930 to 940. In other embodiments, the last step 940 may be skipped, and the first record $R_1$ may be used in the following steps instead of the hash sum $H_1$ resulting from step 940. The embodiment illustrated in FIG. 9 may, however, allow simpler and more robust programming.

Figure 10:
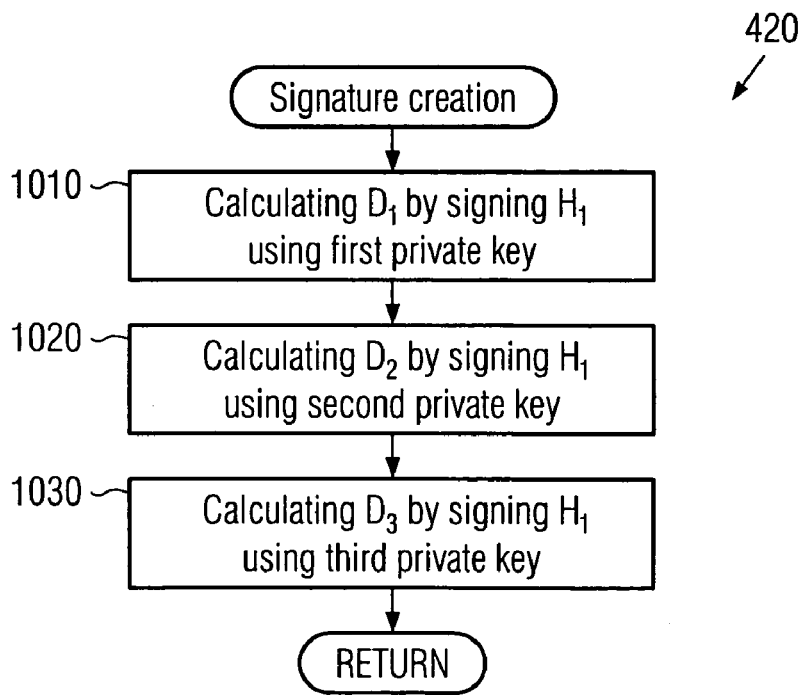
FIG. 10 is a flow diagram showing signature creation according to the other embodiment.

The modified signature creation 420 according to the present embodiment is shown in FIG. 10.

In step 1010, a first digital signature $D_1$ 1310 may be calculated by signing (i.e., hashing and decrypting/encrypting or simply decrypting/encrypting, as discussed above with regard to FIG. 7) the first hash sum $H_1$ 1350 using the first private key selected in step 610 of FIG. 6. A second digital signature $D_2$ 1320 may accordingly be calculated in step 1020 by signing the first hash sum $H_1$ 1350 using the second private key selected in step 620. Finally, in step 1030 a third digital signature $D_3$ 1330 may be generated by signing the first hash sum $H_1$ 1350 using the third private key resulting from step 630.

The depicted sequence of steps is not to be construed as limiting the present invention. For example, the digital signatures $D_1$ to $D_3$ may be calculated in a different order. Further, the calculation steps 1010 to 1030 may be interleaved with the steps of the private key selection shown in FIG. 6 and/or the hash chain illustrated in FIG. 9. For example, the digital signatures $D_1$ to $D_3$ may be calculated as soon as the first hash sum $H_1$ has been calculated and the corresponding private keys have been selected.

Once the patch server 100 has sent a transmission block 1400 containing an encrypted patch to the patch client 140, the patch may be securely installed at the patch client 140 using the public key matrix 150 and the KEK key 160. A secure patch installation process performed by the patch client 140 according to an embodiment will now be described with reference to FIGS. 15–17. This patch installation process may be employed in an embodiment where the digital signatures $D_1$ to $D_3$ 1110, 1120, 1130 are verified only after decrypting the entire patch.

Figure 15:
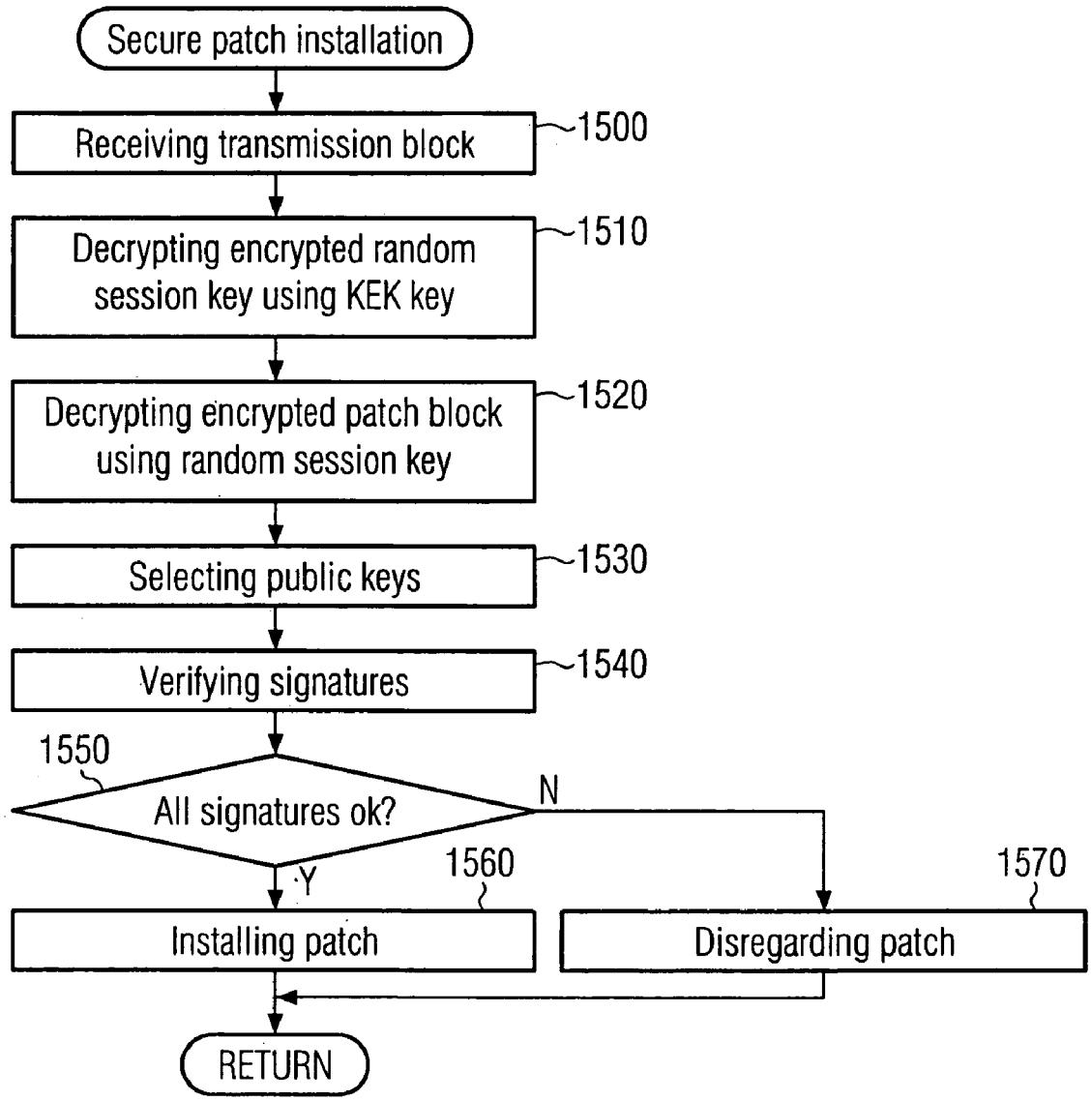
FIG. 15 is a flow diagram illustrating a patch installation process according to an embodiment.

Referring first to FIG. 15, the transmission block 1400 may be received at the patch client 140 in step 1500. Then the encrypted random session key 1410 may be decrypted in step 1510 using the KEK key 160. In step 1520, the encrypted patch block 1420 may be decrypted under the AES algorithm using the random session key obtained before in step 1510. The decryption in steps 1510 and 1520 may be achieved using the OFB mode described above with respect to FIG. 8.

In step 1530, the public keys to be used for verifying the signatures may be selected. This is shown in more detail in FIG. 16.

First, in step 1610 a first public key may be selected from the first public key group 360 using the first key indicator 1210 decrypted before in step 1520. Specifically, the key among the public keys 300–315 to which the first key indicator 1210 points may be selected as the first public key. The selected first public key may correspond to the first private key selected by the patch server 100 in step 610 (see FIG. 6). Accordingly, steps 1620 and 1630 may include selecting the second and third public keys from the second and third public key group 370, 380, respectively, using the second and third key indicator 1220, 1230, respectively. The second and third public keys may correspond to the second and third private keys, respectively, selected by the patch server 100 in steps 620 and 630, respectively.

Of course, the public key selection steps 1610 to 1630 could be performed in any other order. Further, in embodiments where more or less than three public key groups 360–380 (and accordingly more or less than three private key groups 260–280) are used, the public key selection 1530 may accordingly include more or less selection steps.

Figure 17:
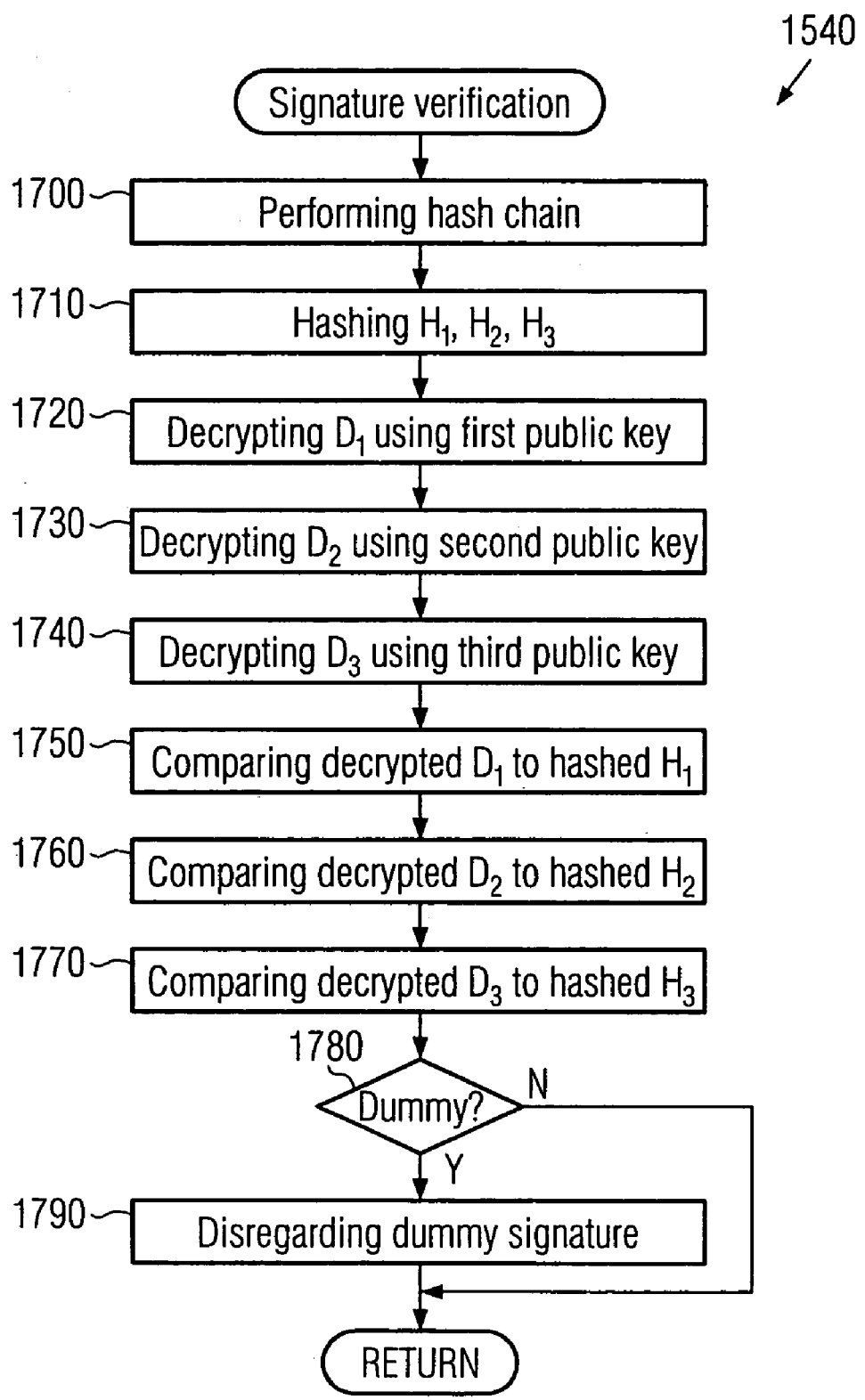
FIG. 17 is a flow diagram demonstrating the signature verification according to an embodiment.

Upon having selected the public keys, the signatures 1110–1130 may be verified in step 1540. The substeps of the signature verification according to the present embodiment are shown in FIG. 17.

First, a hash chain may be performed in step 700. According to the embodiment, the hash chain 700 performed by the patch client 140 corresponds to the hash chain formed by the patch server 100 described above with reference to FIG. 5.

Then, in step 710, the hash sums $H_1$, $H_2$ and $H_3$ resulting from steps 520, 530 and 540, respectively may be hashed again. In embodiments where the signing performed by the patch server 100 in steps 710–730 does not include further hashing but only decryption/encryption, step 1710 may be skipped.

Following step 1710, the digital signatures ($D_1$–$D_3$) 1110, 1120, 1130 obtained when decrypting the encrypted patch block 1420 in step 1520 may be decrypted using the first, second and third public keys respectively.

Then, in steps 1750–1770 the decrypted digital signatures resulting from steps 1720–1740 may be compared to the again hashed hash sums $H_1$ to $H_3$, respectively, obtained in step 1710. In embodiments where step 1710 is skipped, the decrypted digital signatures may be compared directly to the hashed sums $H_1$ to $H_3$, respectively.

In step 1780, it may be determined whether there are dummy signatures among the digital signatures ($D_1$–$D_3$) 1110, 1120, 1130. This may be achieved by checking the dummy indicator 1240 of the key indicator 1140.

If this is the case, it may be determined in step 1790 that the digital signature identified by the dummy indicator 1240 as a dummy signatures is disregarded during the remainder of the secure patch installation process. In other embodiments, more than one digital signature may be a dummy signature, as discussed above. In such embodiments, all the dummy signatures may be ignored during the further patch installation process.

If step 1780 reveals that the dummy indicator 1240 specifies that all the digital signatures 1110–1130 are valid signatures, i.e., no dummy signatures, step 1790 may not be performed and all the digital signatures 1110, 1120, 1130 may be taken into account during the following steps of the secure patch installation.

Once the signatures have been verified in step 1540, it may be determined in step 1550 whether all digital signatures 1110, 1120, 1130 are in order. According to the present embodiment, this is the case if the comparing steps 1750 to 1770 reveal identity. If so, the patch may be installed in the patch client 140 in step 1560. Step 1560 may include providing the user of the patch client 140 with a report of the successful patch installation and/or informing the patch server 100 accordingly.

If however, at least one of steps 1750–1770 reveals that a decrypted digital signature is not identical to the corresponding (hashed) hash sum, it may be determined in step 1570 that the received patch is not to be installed in the patch client 140. This may include, for example, providing the user with an error message and/or informing the patch server 100 that the patch installation failed.

Figure 16:
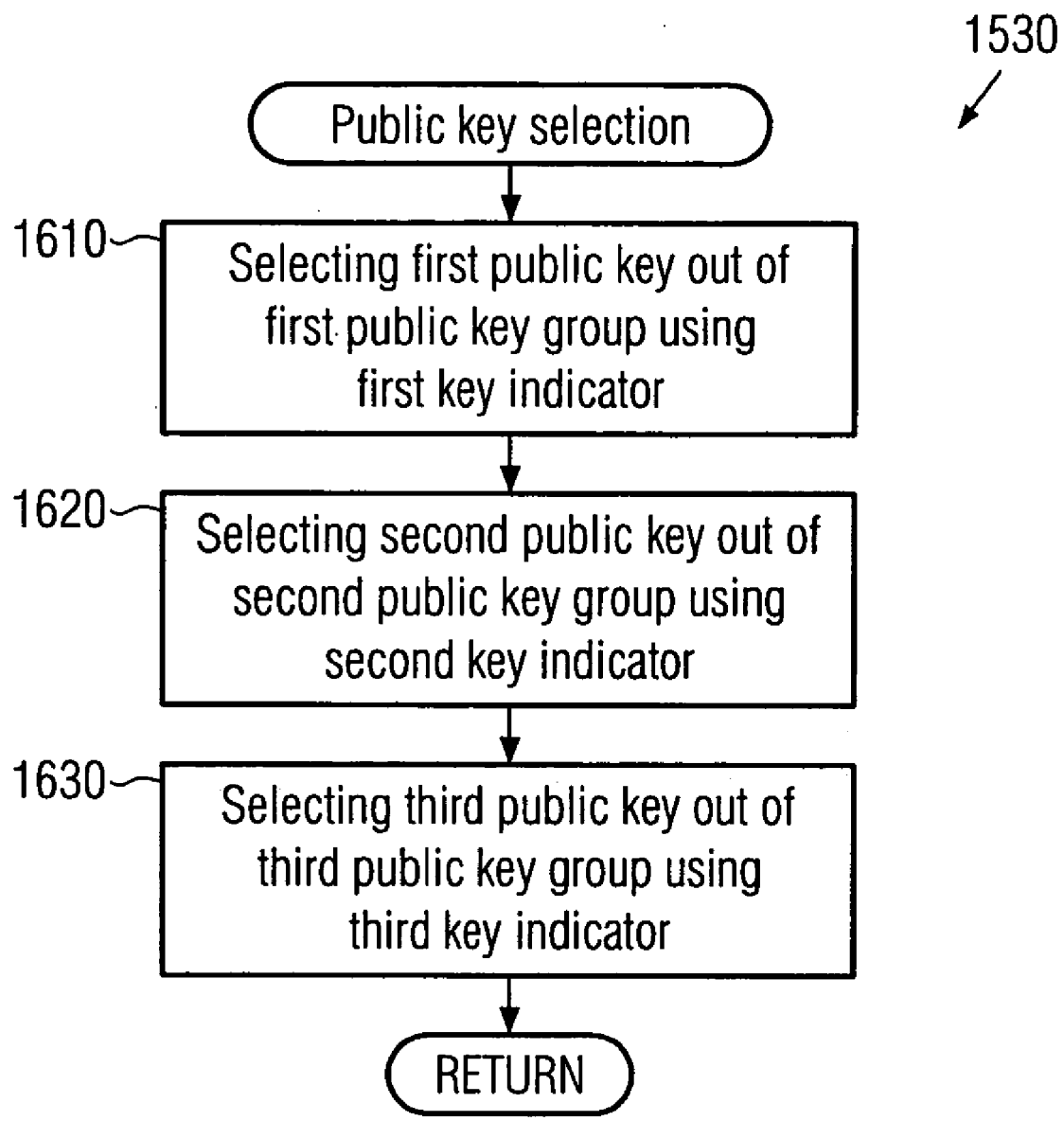
FIG. 16 is a flow diagram illustrating public key selection according to an embodiment.

It is to be understood that the particular sequence of steps shown in FIGS. 15–17 has been chosen for illustration purposes only. In other embodiments, the individual substeps may be arranged in different orders, for example, the decryption steps 1720–1740 could be interleaved with the comparison steps 1750–1770. Further, the hashing step 1710 could be separated into three individual substeps, which may also be interleaved with the decryption in comparison steps 1720–1770. Furthermore, the individual steps 510–540 of the hash chain 1700 could be spread among the hashing decryption and comparison steps 1710–1770.

Moreover, in embodiments where more or less private and public key groups are used, the signature verification 1540 may accordingly contain more or less hashing, decryption and comparison steps 1710 to 1770.

Furthermore, the dummy handling in steps 1780 and 1790 may be brought forward before the first decryption step 1720 or even at the beginning of the signature verification 1540 or before the public key selection 1530. If it is determined in steps 1780 of such embodiments that a particular signature 1110, 1120, 1130 is a dummy signature, the corresponding steps of the public key selection 1530 and signature verification 1700–1770 may be skipped. For example, if the third digital signature $D_3$ is a dummy signature, it may not be necessary to calculate the third hash sum $H_3$ step 540, select a third public key in step 1630, hash the third hash sum $H_3$ in step 1710, decrypt the third digital signature in step 1740 and/or perform the comparison of step 1770.

As already mentioned above, the patch installation scheme of the present embodiment allows the signatures to be verified only after the entire encrypted patch block 1420 has been decrypted. However, there may be embodiments in which it is desirable to verify whether the patch is to be installed immediately after having decrypted individual records of the patch. The operation of the patch server 100 in such an embodiment has been described above with respect to FIGS. 9, 10 and 13. A corresponding secure patch installation to be performed by the patch client 140 will now be described, referring to FIGS. 18 to 20.

Figure 18:
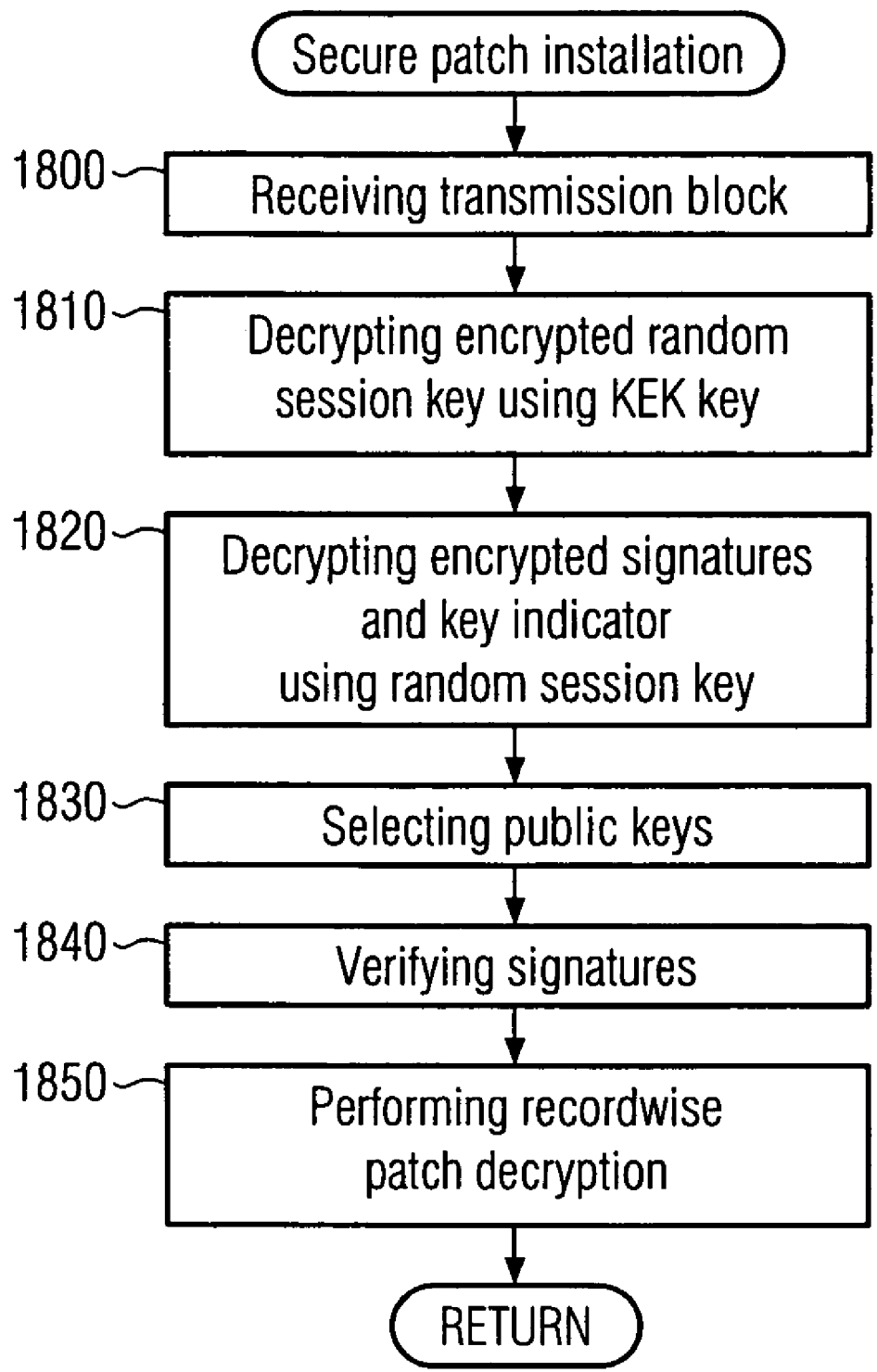
FIG. 18 is a flow diagram illustrating patch installation according to another embodiment.

In step 1800 of FIG. 18, a transmission block 1400 may be received at the patch client 140. In step 1810, the encrypted random session key 1410 included in the transmission block 1400 may be decrypted using the KEK key 160. This step may correspond to step 1510 of FIG. 15.

Subsequently, in step 1820 the random session key obtained in step 1810 may be used to decrypt information contained in the encrypted patch block 1420. The decryption performed in step 1820 may be achieved in the same way as the decryption carried out in step 1520. However, according to the present embodiment only the encrypted signatures and encrypted key indicator may be decrypted in step 1820. The remainder of the encrypted patch block 1420 may later be decrypted recordwise in steps 1840 and 1850.

In step 1830, public keys may be selected based on the key indicator 1340 retrieved in step 1820. This may correspond to the public key selection 1530 described above with reference to FIG. 15. Then in step 1840, the digital signatures ($D_1$ to $D_3$) 1310, 1320, 1330 obtained in step 1820 may be verified. This is shown in more detail in FIG. 19.

First in step 1900, the encrypted first hash sum and encrypted first record of the patch both received in the transmission block 1400 may be decrypted using the random session key obtained in step 1810. This may be achieved in the same way as the decryption in step 1520 explained above with respect to FIG. 15. Subsequently, the first hash sum $H_1$ 1350 recovered in step 1900 may be hashed in step 1910. In other embodiments, particularly in embodiments where the signing performed by the patch server 100 in steps 1010 to 1030 does not include any hashing, step 1910 may be skipped.

Subsequently, in steps 1920 to 1940 the digital signatures ($D_1$ to $D_3$) 1310–1330 resulting from step 1820 may be decrypted using the first to third public keys, respectively, which were selected in step 1830. Each of the results of steps 1920 to 1940 may then be compared to the result of step 1910 in steps 1950–1970, respectively. In embodiments where step 1910 is skipped, the decrypted signatures resulting from steps 1920 to 1940 may be compared to the hash sum $H_1$ resulting from step 1900 instead.

Finally, dummy signatures handling may be performed in steps 1980 and 1990. This may correspond to the dummy signature handling described above with respect to steps 1780 and 1790 of FIG. 17.

Figure 19:
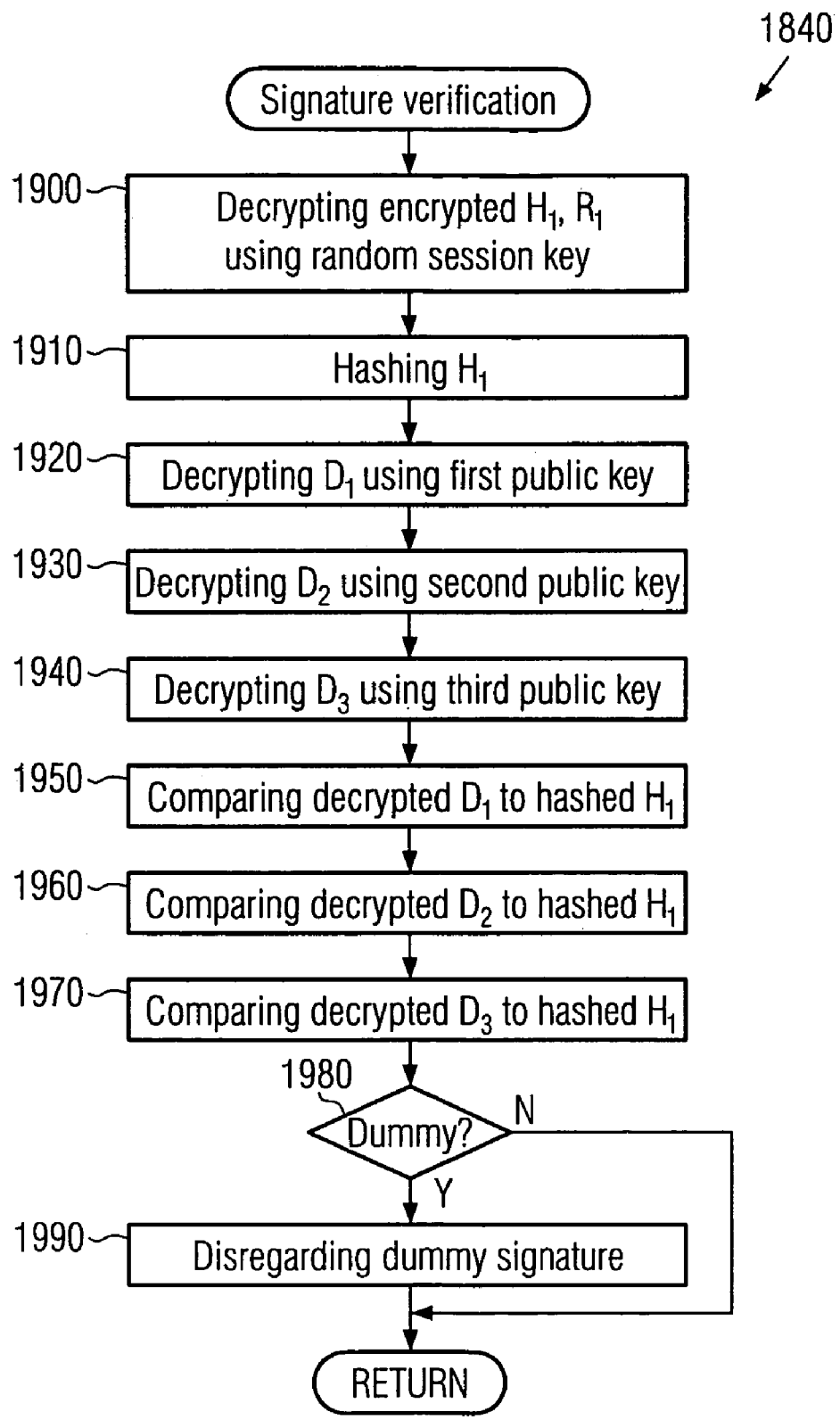
FIG. 19 illustrates the signature verification according to the other embodiment.

Again, the specific sequence of steps shown in FIGS. 18 and 19 is only illustrative and is not to be understood as limiting the invention. In other embodiments, the respective steps may be ordered differently, for example interleaved. Further, the dummy signature handling of steps 1980 and 1990 may be brought forward, e.g., to the beginning of the signature verification 1840 or before the public key selection 1830. In such embodiments, all the steps of the public key selection 1830 and the signature verification 1900–1970 relating to a digital signature identified by the dummy indicator 1240 as a dummy signature may be skipped.

Figure 20:
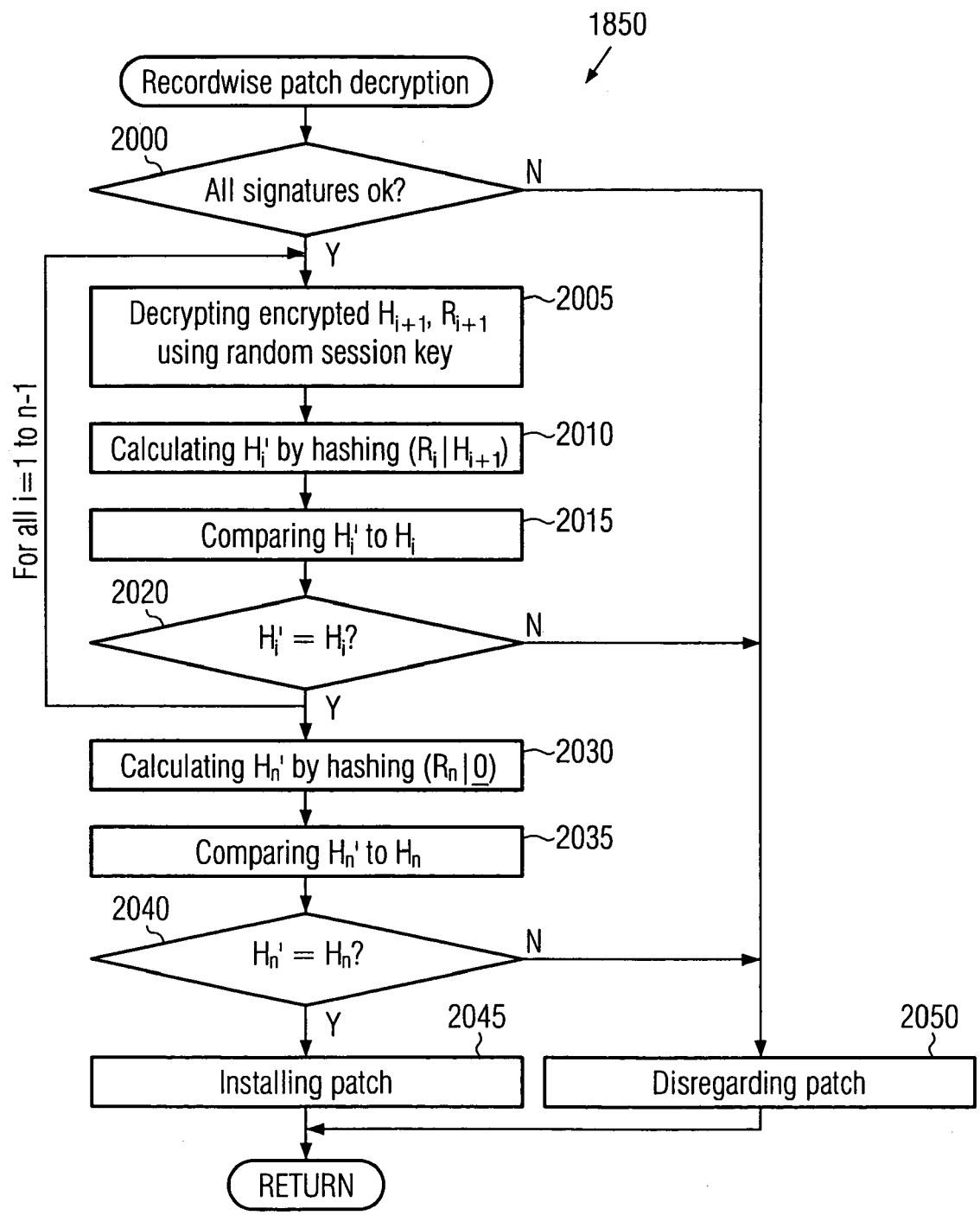
FIG. 20 is a flow diagram illustrating recordwise patch decryption according to the other embodiment.

Returning now to FIG. 18, the remainder of the encrypted patch block 1420 may be decrypted recordwise in step 1850. A recordwise patch decryption scheme according to the present embodiment is shown in FIG. 20.

Thereby, it may first be checked in step 2000 whether all the signatures $D_1$ to $D_3$ are in order. Step 2000 may include determining whether all the comparison steps 1950–1970 reveal identity. As discussed above, eventual dummy signatures may not be regarded for this determination.

If this is not the case, i.e., at least one of the decrypted digital signatures $D_1$ to $D_3$ is not identical to the (hashed) hash sum $H_1$, it may be determined in step 2050 that the present patch is not to be installed. This may correspond to step 1570 of FIG. 15.

If however, all the signatures are in order, the second encrypted hash sum and second encrypted patch record contained in the encrypted patch block 1420 may be decrypted using the random session key obtained in step 1810. The decryption of step 2005 may be performed in the same way as the decryption of step 1820 discussed above. Then, in step 2010, the concatenation of ($R_1|H_2$) of the first record $R_1$ 1355 (obtained already in step 1900) with the second hash sum $H_2$ 1360 obtained in step 2005 may be hashed in step 2010.

The result may be compared to the hash sum $H_1$ 1350 previously obtained (in the decryption step 1900). If it is determined in step 2020 that these two hash sums are not identical, the patch decryption scheme may proceed to step 2050 to determine that the patch is not to be installed. Otherwise, steps 2005 to 2020 may accordingly be repeated for the third to last hash sums and records in the encrypted patch block 1420, respectively.

If the comparison in step 2020 has been positively answered for all the decrypted hash sums and records, the concatenation ($R_n|0$) of the last patch record $R_n$ 1385 with the hash sum value "0" consisting of zero bits may be calculated in step 2030. This value may be compared to the last hash sum $H_n$ 1380 of the patch block 1300 in step 2035.

If it is determined in step 2040 that the two values are identical, the patch may be installed in step 2045, and the user and/or the patch server 100 may be notified of the successful patch installation. Otherwise, it may be determined in step 2040 that the patch is not to be installed.

According to the embodiment illustrated in FIGS. 18 to 20, a received patch is either installed entirely in step 2045 or not installed at all, even if only one patch record may be damaged. In such an embodiment, one flipped bit or deleted/inserted byte in the patch suffices to prevent booting of the patch client 140. This may provide increased security, protecting for example, against worms which modify patches in a way that a user gets the impression of having received only a malformed patch.

However, in other embodiments, where security is not required to this extent, the records 1355, 1365, 1375, 1385 of the patch for which step 2000, 2020 or 2040, respectively is answered positively may be installed. Thus, a negative answer to steps 2000, 2020 or 2040 may not lead to disregarding the entire patch in step 2050 but only the record 1355, 1365, 1375, 1385 currently checked. In such systems, security could still be enhanced by forcing the user to check for example an MD5 sum when receiving a patch or including some preliminary check in the patch installation process. The regarding of only individual records 1355, 1365, 1375, 1385 of the patch may be allowed by the use of the OFB encryption mode since the OFB mode localizes errors.

According to the described embodiments, the secure patch installation process is accomplished by the patch client 140 automatically and the user does not have any influence on the process. Further, the user does not have any possibility of seeing what happens inside the patch client 140 either. However, a user may be provided with an error message in step 1570 or 2050 or a report that the patch has been installed correctly in step 1560 or 2045.

Moreover, according to the present embodiment there may be no possibility for turning off the described security functions. This may prevent attacks due to "shadow" variables reporting about the state of the security disable pin. In embodiments where turning off the security function is desired for performance reasons, it may be guaranteed that this variable cannot be modified by any software. This is because the software which sets such a variable could also be attacked.

As apparent from the above description of embodiments, methods and systems for updating software with increased secret protection and key loss tolerance are provided. Particularly, the security may be significantly increased by using different key generation platforms 110, 120, 130.

By combining keys from the different creation platforms 110, 120, 130, the risk of weak signature keys arising if a platform 110, 120, 130 used for key generation has security holes is reduced. Usually, this risk leads to the problem of hardware changes in silicon to embed new keys, which is very expensive. Thus, the proposed combination of keys generated on different platforms 110, 120, 130 also reduces product and maintenance costs.

Protection against key losses, i.e., cases in which keys are not available anymore, may be achieved by using a bit indicator 1140, 1340, pointing to the keys to be selected out of a matrix 150. Thereby, the need to change hardware or use revocation lists in case of key loss may be avoided.

Further, the proposed use of three keys out of a matrix comprising twelve keys for the three digital signatures $D_1$ to $D_3$ may increase protection against cases in which keys are revealed/stolen, thus available to the public. This may make it more difficult for attackers to insert fake patches. At least a complete set of three secret keys (which may be protected by different methods or entities) need to get stolen forming a key set from all three columns 260, 270, 280 of the key matrix to set up an attack. Even in such a case, only about $1/64$ of all the patch clients 140 could be infected by fakes, supposed that the indiscretion is not known. For known indiscretions, theoretically up to ten keys can be compromised without destroying security: the dummy indicator 1240 containing two bits of the mentioned key indicator 1140, 1340 may allow compromising all four keys of one the private key groups 260, 270, 280. In alternative embodiments where four signatures are used and no dummy signatures are allowed, the probability even decreases from $1/64$ to $1/256$ (where at least four private keys must be leaked). However, in such embodiments there must be at least one valid key of each private key group to maintain security.

The hash chains described above with respect to FIGS. 5 and 9 may allow to include different parties in the signature process where none of them is able to state whether they signed the same patch package. This may provide further security in some scenarios, while keeping the costs at the same level.

Moreover, the hash chains of FIGS. 5 and 9 provide an important security win. Newest results give hints on fatal flaws of cryptographic hash functions like MD5 and SHA-0 (Secure Hash Algorithm 0). It is not clear whether SHA-1 can be broken and whether it can ever be broken in a usable manner. However, even if meaningful different texts with the same SHA-1 hash value can be constructed, it is completely unrealistic that this would be possible for two or even more chained hashes, as provided by the hash chains shown in FIGS. 5 and 9.

The proposed concept guarantees patch integrity very well using several digital signatures, $D_1$ to $D_3$, using heterogeneous public keys combined with a careful key management. Even in embodiments where only HSM keys are used, the security will still be high. The patch contents may be protected by encryption with a KEK key that may be hidden in the patch client's firmware.

In embodiments where a trusted third party (TTP) is involved in the security process, only hash values may have to be signed. Thereby the security may further be enhanced since the risk of showing the patch source may be avoided.

The costs of the proposed solution are low in comparison to the gains. Patch development and distribution is by far more expensive than key handling, back up, digitally signing and encrypting, even in embodiments where several instances are involved in this process. Production costs for the patch clients 140 are nearly fixed and may change only marginally by adding the described secure patch functionality. Decryption and signature check may require minimal time during boot of the patch clients 140. The security win over a prior art plain patch system however, is considerable. Thus, the presented embodiments may significantly increase the security, reliability and efficiency of patch systems, without unduly increasing the corresponding costs.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

What is claimed is:

1. A patch server connected to a patch client for providing a patch to said patch client, the patch server comprising:
   a first key generation platform arranged to generate a first private key group comprising a plurality of first private keys;
   a second key generation platform different from said first key generation platform and arranged to generate a second private key group comprising a plurality of second private keys;
   a first key selector arranged to select one of said first private keys from said first private key group;
   a second key selector arranged to select one of said second private keys from said second private key group;
   a first signature generator arranged to generate a first digital signature based on said patch and said first selected private key;
   a second signature generator arranged to generate a second digital signature based on said patch and said second selected private key; and
   a transmitter arranged to transmit said patch together with said first and second digital signatures to said patch client.

2. The patch server of claim 1, further comprising:
   a first hasher arranged to calculate a first hash sum based on said patch; and
   a second hasher arranged to calculate a second hash sum based on said first hash sum;
   wherein first signature generator is further arranged to generate said first digital signature based on said second hash sum.

3. The patch server of claim 2, further comprising:
   a third hasher arranged to calculate a third hash sum based on said second hash sum;
   wherein said second signature generator is further arranged to generate said second digital signature based on said third hash sum.

4. The patch server of claim 1, further comprising:
   a hasher arranged to calculate a plurality of hash sums;
   wherein said patch comprises a plurality of records;
   wherein said hasher is further arranged to calculate a first hash sum of said plurality of hash sums based on the last record comprised in said patch; and
   wherein said hasher is further arranged to calculate each further hash sum of said plurality of hash sums based on a respective next last record comprised in said patch and a respective last calculated hash sum of said plurality of hash sums.

5. The patch server of claim 4, wherein said first signature generator is further arranged to generate said first digital signature based on the last calculated hash sum of said plurality of hash sums; and
wherein said transmitter is further arranged to transmit said patch together with said first and second digital signatures and said plurality of hash sums to said patch client.

6. The patch server of claim 4, wherein said second signature generator is further arranged to generate said second digital signature based on the last calculated hash sum of said plurality of hash sums; and
wherein said transmitter is further arranged to transmit said patch together with said first and second digital signatures and said plurality of hash sums to said patch client.

7. The patch server of claim 1, further comprising:
a key indicator generator arranged to generate a key indicator comprising a first key indicator indicating which first private key has been selected from said first private key group and a second key indicator indicating which second private key has been selected from said second private key group;
wherein the transmitter is further arranged to transmit said patch together with said first and second digital signatures and said key indicator to said patch client.

8. The patch server of claim 7, wherein said key indicator generator is further arranged to generate said key indicator further comprising a dummy indicator identifying one of said first and second digital signatures as a dummy signature.

9. The patch server of claim 1, further comprising:
a session key generator arranged to generate a random session key;
a first encryption component arranged to encrypt said patch with said random session key using a symmetric encryption algorithm; and
a second encryption component arranged to encrypt said random session key with a master key;
wherein said transmitter is further arranged to transmit said patch in encrypted form together with said first and second digital signatures and said encrypted random session key to said patch client.

10. The patch server of claim 9, wherein said first encryption component is further arranged to encrypt said first and second digital signatures with said random session key using said symmetric encryption algorithm; and
wherein said transmitter is further arranged to transmit said patch in encrypted form together with said first and second digital signatures in encrypted form and said encrypted random session key to said patch client.

11. A method of providing a patch to a patch client, comprising:
generating a first private key group comprising a plurality of first private keys using a first key generation platform;
generating a second private key group comprising a plurality of second private keys using a second key generation platform different from said first key generation platform;
selecting one of said first private keys from said first private key group;
selecting one of said second private keys from said second private key group;
generating a first digital signature based on said patch and said first selected private key;
generating a second digital signature based on said patch and said second selected private key; and
transmitting said patch together with said first and second digital signatures to said patch client.

12. The method of claim 11, further comprising:
calculating a first hash sum based on said patch; and
calculating a second hash sum based on said fist hash sum;
wherein generating said first digital signature comprises generating said first digital signature based on said second hash sum and said first selected private key.

13. The method of claim 12, further comprising:
calculating a third hash sum based on said second hash sum;
wherein generating said second digital signature comprises generating said second digital signature based on said third hash sum and said second selected private key.

14. The method of claim 11, further comprising:
calculating a plurality of hash sums;
wherein said patch comprises a plurality of records;
wherein calculating said plurality of hash sums comprises calculating a first hash sum of said plurality of hash sums based on the last record comprised in said patch; and
wherein calculating said plurality of hash sums further comprises calculating each further hash sum of said plurality of hash sums based on a respective next last record comprised in said patch and a respective last calculated hash sum of said plurality of hash sums.

15. The method of claim 14, wherein generating said first digital signature comprises generating said first digital signature based on the last calculated hash sum of said plurality of hash sums; and
wherein transmitting said patch comprises transmitting said patch together with said first and second digital signatures and said plurality of hash sums to said patch client.

16. The method of claim 14, wherein generating said second digital signature comprises generating said second digital signature based on the last calculated hash sum of said plurality of hash sums; and
wherein transmitting said patch comprises transmitting said patch together with said first and second digital signatures and said plurality of hash sums to said patch client.

17. The method of claim 11, further comprising:
generating a key indicator comprising a first key indicator indicating which first private key has been selected from said first private key group and a second key indicator indicating which second private key has been selected from said second private key group;
wherein transmitting said patch comprises transmitting said patch together with said first and second digital signatures and said key indicator to said patch client.

18. The method of claim 17, wherein generating said key indicator comprises generating said key indicator further comprising a dummy indicator identifying one of said first and second digital signatures as a dummy signature.

19. The method of claim 11, further comprising:
generating a random session key;
encrypting said patch with said random session key using a symmetric encryption algorithm; and
encrypting said random session key with a master key;
wherein transmitting said patch comprises transmitting said patch in encrypted form together with said first and second digital signatures and said encrypted random session key to said patch client.

20. The method of claim 19, further comprising:
encrypting said first and second digital signatures with said random session key using said symmetric encryption algorithm;
wherein transmitting said patch comprises transmitting said patch in encrypted form together with said first and second digital signatures in encrypted form and said encrypted random session key to said patch client.

21. A patch client connected to a patch server for receiving a patch from said patch server, the patch client comprising:
first storage means storing a first public key group comprising a plurality of first public keys which have been generated by a first key generation platform;
second storage means storing a second public key group comprising a plurality of second public keys which have been generated by a second key generation platform different from said first key generation platform;
a first key selector arranged to select one of said first public keys from said first public key group;
a second key selector arranged to select one of said second public keys from said second public key group;
a first signature verification component arranged to verify a first digital signature received from said patch server together with said patch using said first selected public key; and
a second signature verification component arranged to verify a second digital signature received from said patch server together with said patch using said second selected public key;
wherein said patch client is arranged to install said patch only if the results of verifying said first and second digital signatures indicate authenticity and integrity of said first and second digital signatures, respectively.

22. The patch client of claim 21, further comprising:
a first hasher arranged to calculate a first hash sum based on said patch; and
a second hasher arranged to calculate a second hash sum based on said first hash sum;
wherein said first signature verification component is further arranged to verify said first digital signature based on said second hash sum.

23. The patch client of claim 22, further comprising:
a third hasher arranged to calculate a third hash sum based on said second hash sum;
wherein said second signature verification component is further arranged to verify said second digital signature based on said third hash sum.

24. The patch client of claim 21, wherein said first signature verification component is further arranged to verify said first digital signature based on a first hash sum received from said patch server together with said patch; and
wherein said second signature verification component is further arranged to verify said second digital signature based on said first hash sum.

25. The patch client of claim 21, wherein said first key selector is further arranged to select said one of said first public keys according to a first key indicator received from said patch server together with said patch; and
wherein said second key selector is further arranged to select said one of said second public keys according to a second key indicator received from said patch server together with said patch.

26. The patch client of claim 21, further arranged to disregard the result of verifying said first or second digital signature if a dummy indicator received from said patch server together with said patch identifies said first or second digital signature, respectively, as a dummy signature.

27. The patch client of claim 21, further comprising:
third storage means storing a master key;
a first decryption component arranged to decrypt an encrypted random session key received from said patch server together with said patch using said master key to obtain the random session key; and
a second decryption component arranged to decrypt said patch by applying a symmetric decryption algorithm using said random session key.

28. The patch client of claim 27, wherein said second decryption component is further arranged to decrypt said first and second digital signatures by applying said symmetric decryption algorithm using said random session key.

29. The patch client of claim 27, wherein said master key is stored in said third storage means hidden among other information stored in said third storage means.

30. The patch client of claim 27, wherein said master key is input into said third storage means during the production process of the patch client.

31. The patch client of claim 21, wherein said first public key group and said second public key group are input into said first and second storage means, respectively, during the production process of the patch client.

32. A method of installing a patch in a patch client, comprising:
receiving said patch together with a first digital signature and a second digital signature from a patch server connected to said patch client;
storing a first public key group comprising a plurality of first public keys in said patch client, wherein said first public keys have been generated by a first key generation platform;
storing a second public key group comprising a plurality of second public keys in said patch client, wherein said second public keys have been generated by a second key generation platform different from said first key generation platform;
selecting one of said first public keys from said first public key group;
selecting one of said second public keys from said second public key group;
verifying said first digital signature using said first selected public key;
verifying said second digital signature using said second selected public key; and
installing said patch in said patch client only if the results of verifying said first and second digital signatures indicate authenticity and integrity of said first and second digital signatures, respectively.

33. The method of claim 32, further comprising:
calculating a first hash sum based on said patch; and
calculating a second hash sum based on said first hash sum;
wherein verifying said first digital signature comprises verifying said first digital signature based on said second hash sum.

34. The method of claim 33, further comprising:
calculating a third hash sum based on said second hash sum;
wherein verifying said second digital signature comprises verifying said second digital signature based on said third hash sum.

35. The method of claim 32, further comprising:
receiving a first hash sum from said patch server together with said patch;
wherein verifying said first digital signature comprises verifying said first digital signature based on said first hash sum; and
wherein verifying said second digital signature comprises verifying said second digital signature based on said first hash sum.

36. The method of claim 32, further comprising:
receiving a first key indicator and a second key indicator from said patch server together with said patch;
wherein selecting said one of said first public keys comprises selecting said one of said public keys according to said first key indicator; and
wherein selecting said one of said second public keys comprises selecting said one of said second public keys according to said second key indicator.

37. The method of claim 32, further comprising:
receiving a dummy indicator from said patch server together with said patch; and
disregarding the result of verifying said first or second digital signature if said dummy indicator identifies said first or second digital signature, respectively, as a dummy signature.

38. The method of claim 32, further comprising:
receiving an encrypted random session key from said patch server together with said patch;
storing a master key in said patch client;
decrypting said encrypted random session key using said master key to obtain the random session key; and
decrypting said patch by applying a symmetric decryption algorithm using said random session key.

39. The method of claim 38, further comprising:
decrypting said first and second digital signatures by applying said symmetric decryption algorithm using said random session key.

40. The method of claim 38, wherein storing said master key in said patch client comprises storing said master key hidden among other information stored in said patch client.

41. The method of claim 38, further comprising:
inputting said master key into said patch client during the production process of said patch client.

42. The method of claim 32, further comprising:
inputting said first public key group and said second public key group into said patch client during the production process of said patch client.

* * * * *